US012793593B2

(12) United States Patent
Lee et al.

(10) Patent No.: US 12,793,593 B2

(45) Date of Patent: Nov. 10, 2026

(54) DISPLAY APPARATUS AND OPERATING METHOD THEREOF

(71) Applicant: Samsung Display Co., Ltd., Yongin-si (KR)

(72) Inventors: Seungjun Lee, Yongin-si (KR); Younjoo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/064,550

(22) Filed: Feb. 26, 2025

(65) Prior Publication Data

US 2025/0285572 A1 Sep. 11, 2025

(30) Foreign Application Priority Data

Mar. 11, 2024 (KR) ........................ 10-2024-0034098

(51) Int. Cl.

*G09G 3/00* (2006.01)
*G01L 1/14* (2006.01)
(Continued)

(52) U.S. Cl.

CPC ................ *G09G 3/035* (2020.08); *G01L 1/14* (2013.01); *G01L 1/22* (2013.01); *G06F 3/0446* (2019.05);
(Continued)

(58) Field of Classification Search

CPC ............. G09G 3/035; H10K 2102/311; H10K 77/111; G01L 1/14; G01L 1/22
See application file for complete search history.

(56) References Cited

U.S. PATENT DOCUMENTS

| | | | |
|---|---|---|---|
| 9,007,226 | B2 | 4/2015 | Chang |
| 10,614,757 | B2 | 4/2020 | Takizawa et al. |

(Continued)

FOREIGN PATENT DOCUMENTS

| | | | |
|---|---|---|---|
| CN | 114446160 | A | 5/2022 |
| KR | 10-1879615 | B1 | 7/2018 |

(Continued)

OTHER PUBLICATIONS

International Search Report and Written Opinion of the International Searching Authority, issued Jun. 11, 2025, corresponding to PCT/KR2025/003061, 3 pages.

(Continued)

*Primary Examiner* — Yuzhen Shen

(74) *Attorney, Agent, or Firm* — Womble Bond Dickinson (US) LLP

(57) ABSTRACT

Provided is a display apparatus including a display panel including pixels and a strain sensor, a signal detector configured to detect a first characteristic value, and to generate stretch-sensing data, the first characteristic value corresponding to a degree of stretching of the strain sensor, a memory configured to store a stress-strain profile divided into operation sections, and a signal processor configured to compare a rate of change of the first characteristic value with a threshold value of a current operation section by using the stretch-sensing data and the stress-strain profile, to determine a corresponding operation section among the operation sections, and to generate a control signal according to the corresponding operation section.

21 Claims, 41 Drawing Sheets

(51) Int. Cl.
*G01L 1/22* (2006.01)
*G06F 3/044* (2006.01)
*G09G 3/32* (2016.01)

(52) U.S. Cl.
CPC ....... *G09G 3/32* (2013.01); *G09G 2300/0842* (2013.01); *G09G 2300/0861* (2013.01); *G09G 2330/12* (2013.01); *G09G 2354/00* (2013.01); *G09G 2380/08* (2013.01); *G09G 2380/10* (2013.01)

(56) References Cited

U.S. PATENT DOCUMENTS

| | | | | |
|---|---|---|---|---|
| 10,930,209 | B2 | 2/2021 | Choi et al. | |
| 11,037,478 | B2 | 6/2021 | Ahn et al. | |
| 11,488,499 | B2 | 11/2022 | Shepelev et al. | |
| 11,885,700 | B2 | 1/2024 | Lee et al. | |
| 2013/0127606 | A1* | 5/2013 | Chang | G09G 3/006 340/384.7 |
| 2016/0196774 | A1* | 7/2016 | Lim | G09G 3/20 345/698 |
| 2019/0107911 | A1* | 4/2019 | Zhai | G06F 3/0443 |
| 2020/0286410 | A1* | 9/2020 | Wu | G06F 1/1652 |
| 2022/0231104 | A1* | 7/2022 | Kim | H10K 59/131 |
| 2023/0260439 | A1 | 8/2023 | Lee et al. | |
| 2025/0265956 | A1* | 8/2025 | Kim | G09G 3/32 |

FOREIGN PATENT DOCUMENTS

| | | | |
|---|---|---|---|
| KR | 10-2020-0081945 | A | 7/2020 |
| KR | 10-2022-0028348 | A | 3/2022 |
| KR | 10-2022-0080663 | A | 6/2022 |
| KR | 10-2022-0133623 | A | 10/2022 |
| KR | 10-2484880 | B1 | 1/2023 |
| KR | 10-2023-0040704 | A | 3/2023 |
| KR | 10-2023-0084357 | A | 6/2023 |
| KR | 10-2024-0009843 | A | 1/2024 |
| WO | WO 2017-094604 | A1 | 6/2017 |

OTHER PUBLICATIONS

Liff, Shawna, "Mullins Effect and Thixotropy", 2006 NNF Summer Reading Series dated Aug. 9, 2006, retrieved on Jun. 10, 2024, https://web.mit.edu/nnf/education/Reading_group_2006/liff2006.pdf, 8 pages.

* cited by examiner

DISPLAY APPARATUS AND OPERATING METHOD THEREOF

CROSS-REFERENCE TO RELATED APPLICATION

The present application claims priority to, and the benefit of, Korean Patent Application No. 10-2024-0034098, filed on Mar. 11, 2024, in the Korean Intellectual Property Office, the entire disclosure of which is incorporated herein by reference.

BACKGROUND

1. Field

One or more embodiments relate to a display apparatus and an operating method thereof.

2. Description of the Related Art

In general, as display apparatuses that visually display electrical signals have been developed, various display apparatuses having characteristics, such as thinness, light weight, and low power consumption, have been introduced. For example, flexible display apparatuses that are foldable or rollable into a roll shape have been introduced. Recently, research and development on display apparatuses having various structures, such as stretchable display apparatuses that may be changed into various shapes, have been actively conducted.

SUMMARY

When a display apparatus is deformed beyond a normal operation range, damage, such as a crack, may occur in the display apparatus. One or more embodiments include a display apparatus and an operating method thereof, the display apparatus being configured to determine a stretching operation section of the display apparatus by using a strain sensor and generate a control signal for controlling a display panel and a stretching mechanism, according to the determined stretching operation section. However, this objective is an example, and the scope of the disclosure is not limited thereto.

Additional aspects will be set forth in part in the description which follows and, in part, will be apparent from the description, or may be learned by practice of the presented embodiments of the disclosure.

According to one or more embodiments, a display apparatus includes a display panel including pixels and a strain sensor, a signal detector configured to detect a first characteristic value, and to generate stretch-sensing data, the first characteristic value corresponding to a degree of stretching of the strain sensor, a memory configured to store a stress-strain profile divided into operation sections, and a signal processor configured to compare a rate of change of the first characteristic value with a threshold value of a current operation section by using the stretch-sensing data and the stress-strain profile, to determine a corresponding operation section among the operation sections, and to generate a control signal according to the corresponding operation section.

The operation sections may include a first operation section, a second operation section, and a third operation section, wherein a threshold value of the first operation section corresponds to a boundary point between the first operation section and the second operation section in the stress-strain profile, wherein a threshold value of the second operation section corresponds to a boundary point between the second operation section and the third operation section in the stress-strain profile, and wherein a threshold value of the third operation section corresponds to an end point of the third operation section in the stress-strain profile.

The first operation section may include sub-operation sections, wherein threshold values of the sub-operation sections respectively correspond to boundary points between the sub-operation sections in the stress-strain profile.

The sub-operation sections may be divided based on a slope in the stress-strain profile.

The display panel may further include sub-areas, wherein the signal detector is further configured to detect first characteristic values for the sub-areas, and to generate the stretch-sensing data, and wherein the signal processor is further configured to generate sub-control signals for the sub-areas.

The display panel may further include a touch sensor above the pixels, and integral with the strain sensor.

The touch sensor may include touch electrodes, wherein the first characteristic value indicates an amount of change in capacitance of the touch electrodes.

The control signal may include a first emission control signal configured to turn off a voltage supplied to the pixels.

The control signal may include a second emission control signal configured to turn off transistors included in the pixels.

The control signal may include a display control signal for displaying protection operation activation information on the display panel.

The display apparatus may further include a driving circuit configured to control the display panel, and configured to, based on the control signal, display protection operation information on the display panel, reduce light emission of the display panel, or block a driving voltage supplied to the display panel.

The display apparatus may further include a communication module configured to transmit a signal to a stretching mechanism configured to stretch the display panel, wherein the control signal includes a mechanism control signal transmitted through the communication module for controlling an operation of the stretching mechanism.

The display apparatus may further include a stretching mechanism configured to stretch the display panel, and configured to, based on the control signal, stop a stretching operation of the display panel, or perform a shrinking operation.

According to one or more embodiments, a method of operating a display apparatus including a display panel includes detecting a first characteristic value corresponding to a degree of stretching of the display panel using a strain sensor, generating stretch-sensing data, determining, using the stretch-sensing data and a stress-strain profile pre-stored in a memory, a corresponding operation section among operation sections in the stress-strain profile, and controlling the display panel according to the corresponding operation section.

The operation sections may include a first operation section, a second operation section, and a third operation section, wherein a threshold value of the first operation section corresponds to a boundary point between the first operation section and the second operation section in the stress-strain profile, wherein a threshold value of the second operation section corresponds to a boundary point between the second operation section and the third operation section in the stress-strain profile, and wherein a threshold value of the third operation section corresponds to an end point of the third operation section in the stress-strain profile.

The first operation section may include sub-operation sections, wherein threshold values of the sub-operation sections correspond to boundary points between the sub-operation sections in the stress-strain profile.

The controlling of the display panel may include displaying protection operation information on the display panel that is different for each of the sub-operation sections.

The display panel may include sub-areas, wherein the strain sensor is configured to detect first characteristic values for the sub-areas, and wherein the determining of the corresponding operation section includes determining operation sections for the sub-areas.

The controlling of the display panel may include controlling the sub-areas according to the operation sections.

The controlling of the display panel according to the corresponding operation section may include at least one of displaying protection operation information on the display panel, reducing light emission of the display panel, or blocking a driving voltage supplied to the display panel.

The method may further include, when a rate of change in the first characteristic value is greater than a threshold value of a current operation section, controlling a stretching mechanism according to the corresponding operation section, the stretching mechanism being configured to stretch the display panel.

Other aspects than those described above will be apparent from the following drawings, claims, and detailed description.

Such general and specific aspects may be implemented by using a system, a method, a computer program, or a combination of the system, the method, and the computer program.

BRIEF DESCRIPTION OF THE DRAWINGS

The above and other aspects of certain embodiments of the disclosure will be more apparent from the following description taken in conjunction with the accompanying drawings, in which.

DETAILED DESCRIPTION

Figure 1:
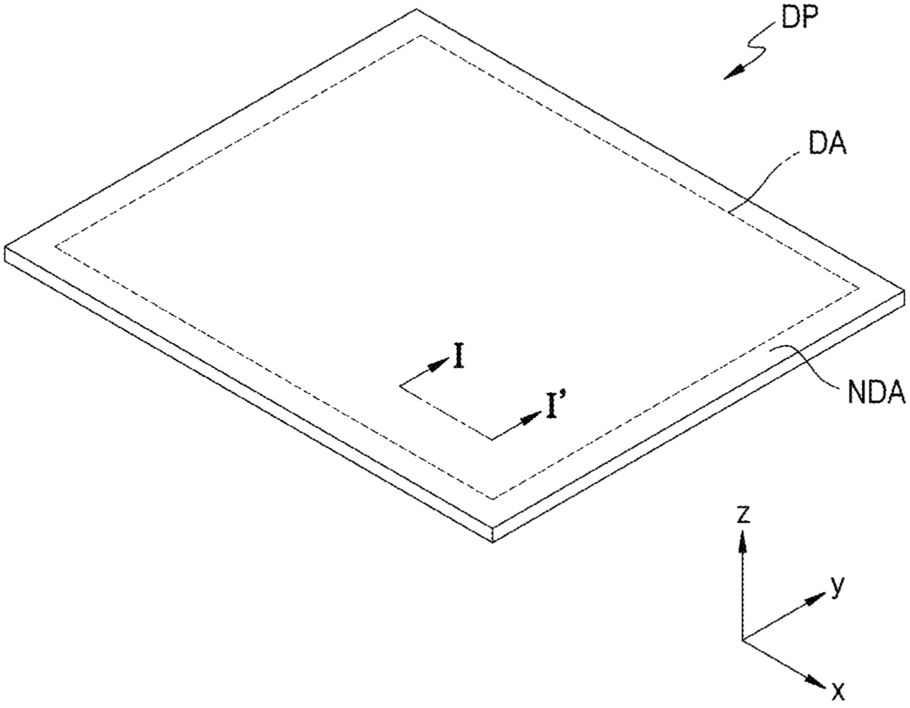
FIG. 1 is a schematic perspective view of a display panel according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
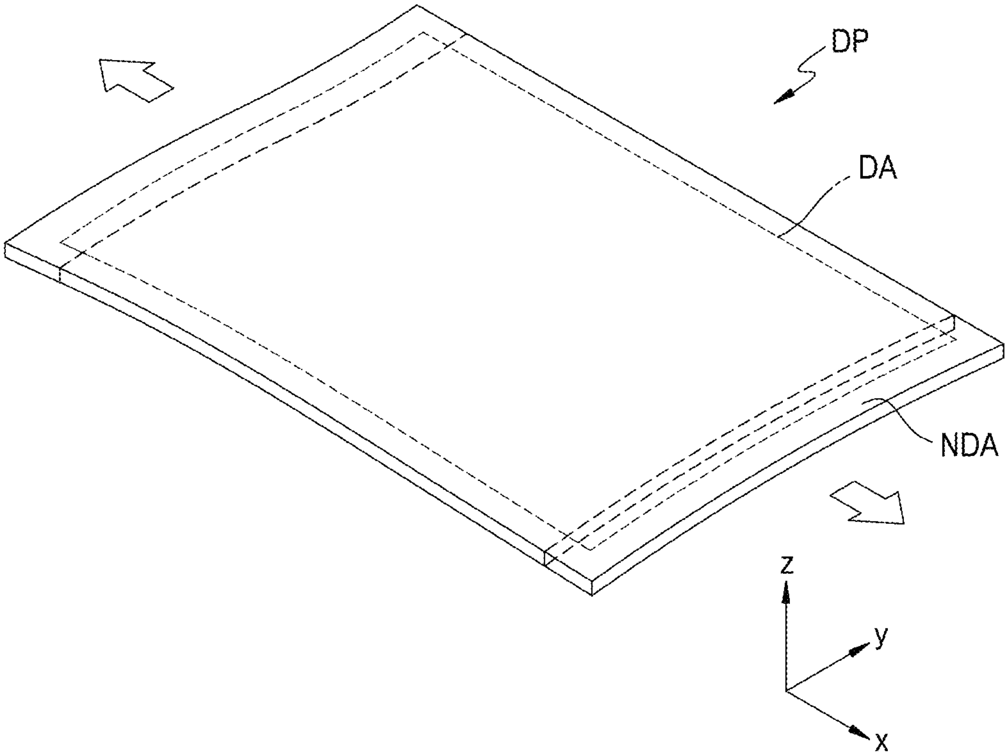
FIGS. 2A and 2B are perspective views of a state in which the display panel of FIG. 1 is stretched in a first direction.
Figure 2B:
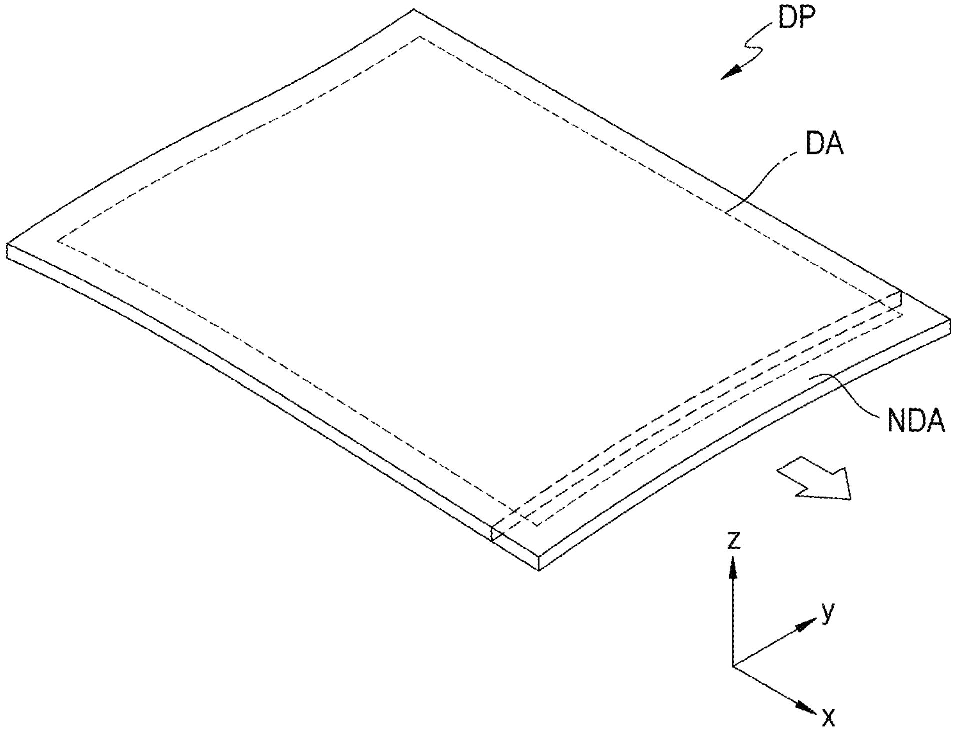
Figure 2C:
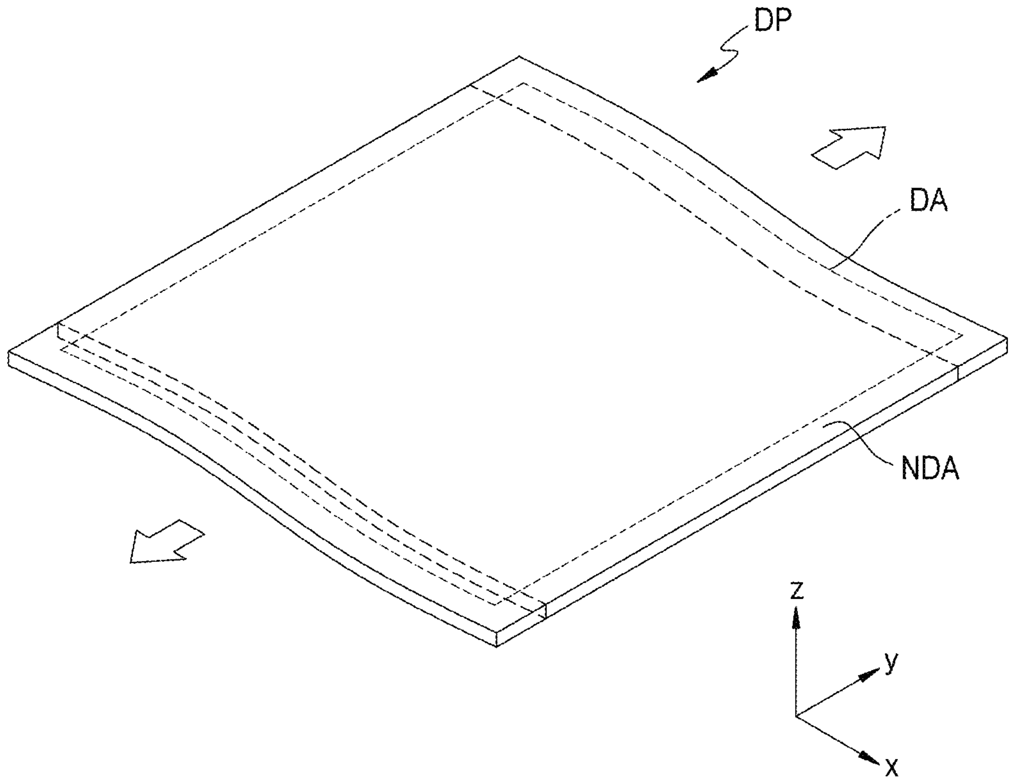
FIG. 2C is a perspective view of a state in which the display panel of FIG. 1 is stretched in a second direction.
Figure 2D:
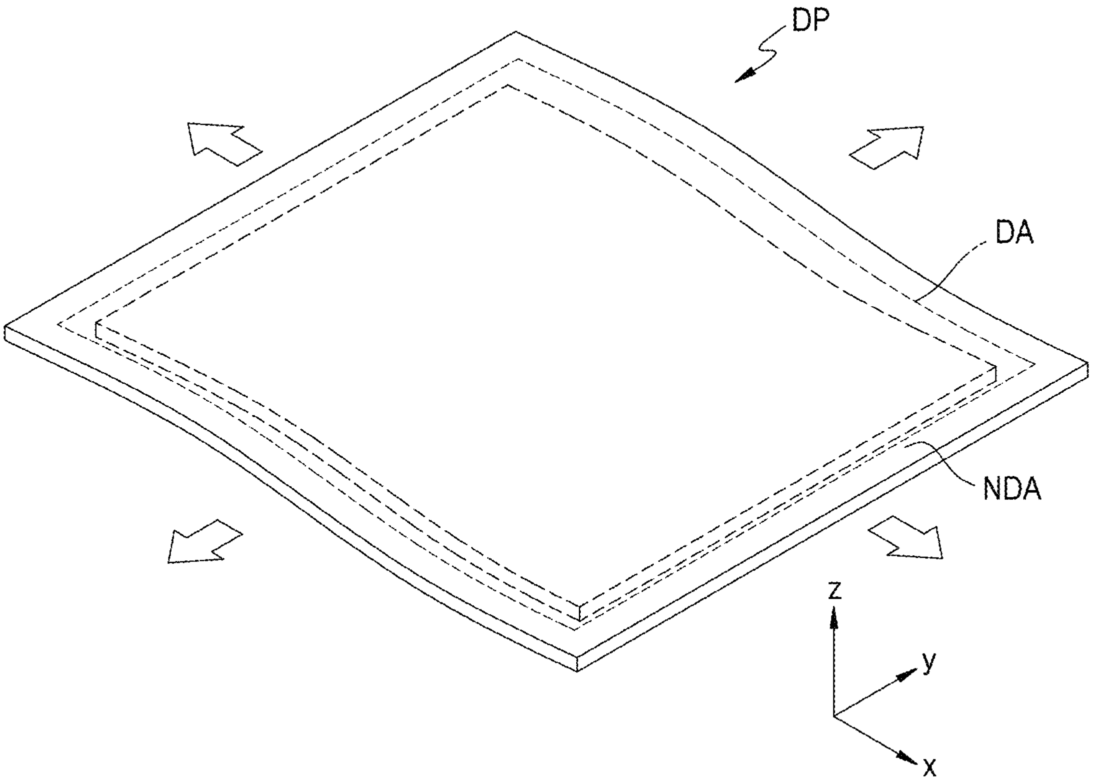
FIG. 2D is a perspective view of a state in which the display panel of FIG. 1 is stretched in the first and second directions.
Figure 2E:
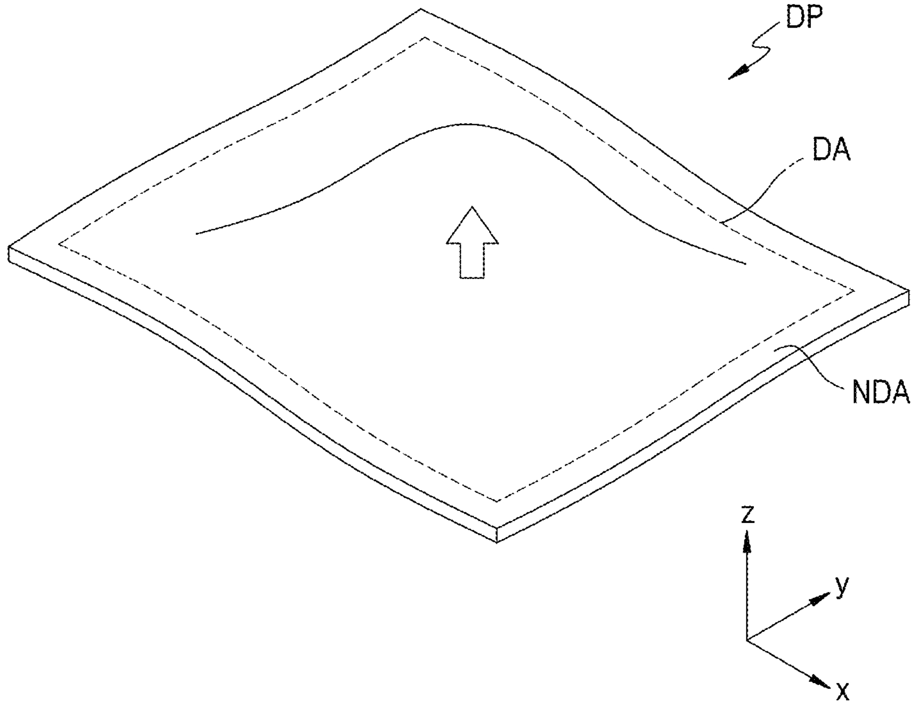
FIG. 2E is a perspective view of a state in which the display panel of FIG. 1 is stretched in a third direction.

FIG. 1 is a schematic perspective view of a display panel DP according to one or more embodiments. FIGS. 2A and 2B are perspective views of a state in which the display panel DP of FIG. 1 is stretched in a first direction. FIG. 2C is a perspective view of a state in which the display panel DP of FIG. 1 is stretched in a second direction. FIG. 2D is a perspective view of a state in which the display panel DP of FIG. 1 is stretched in the first and second directions. FIG. 2E is a perspective view of a state in which the display panel DP of FIG. 1 is stretched in a third direction.

Referring to FIG. 1, the display panel DP may include a display area DA and a non-display area NDA. The display area DA may include a plurality of pixels. The display panel DP may provide a corresponding image by using light emitted from the plurality of pixels. The non-display area NDA may be arranged outside the display area DA. The non-display area NDA may be an area in which pixels are not arranged, and may entirely surround the display area DA (e.g., in plan view).

The display panel DP may be stretched or shrunk in various directions. The display panel DP may be stretched in the first direction (e.g., an x direction and/or a −x direction) due to an external force applied by an external object or a user. In one or more embodiments, as shown in FIGS. 2A and 2B, the display area DA and/or the non-display area NDA of the display panel DP may be stretched in the first direction (e.g., the x direction and/or the −x direction). For example, the display panel DP may be stretched in the x direction and the −x direction, as shown in FIG. 2A, or may be stretched in the x direction with one side thereof fixed, as shown in FIG. 2B.

The display panel DP may be stretched in the second direction (e.g., a y direction and/or a −y direction) due to an external force applied by an external object or a user. In one or more embodiments, as shown in FIG. 2C, the display area DA and/or the non-display area NDA of the display panel DP may be stretched in the y direction and the −y direction. In one or more other embodiments, the display panel DP may be stretched in the y direction or the −y direction with one side thereof fixed.

The display panel DP may be stretched in a plurality of directions, for example, in the first direction (e.g., the x direction and/or the −x direction) and the second direction (e.g., the y direction and/or the −y direction), due to an external force applied by an external object or a part of the human body. As shown in FIG. 2D, the display area DA and/or the non-display area NDA of the display panel DP may be stretched in the ±x direction and the ty direction.

The display panel DP may be stretched in the third direction (e.g., a z direction or a −direction) due to an external force applied by an external object or a part of the human body. In one or more embodiments, FIG. 2E shows that a portion of the display panel DP (e.g., a portion of the display area DA) protrudes in the z direction. In one or more other embodiments, a portion of the display panel DP, for example, a portion of the display area DA, may protrude in the −direction (or be depressed in the z direction).

FIGS. 2A to 2E show that the display panel DP, which has a quadrangular shape in a plan view, is stretched in the first direction, the second direction, and/or the third direction, but the disclosure is not limited thereto. In one or more embodiments, the display panel DP may have a circular shape in a plan view, and may be stretched radially in a radial direction from the center of the circular shape. In one or more other embodiments, the display panel DP may be deformed in various ways, for example, may be bent or twisted along two or more axes.

Figure 3A:
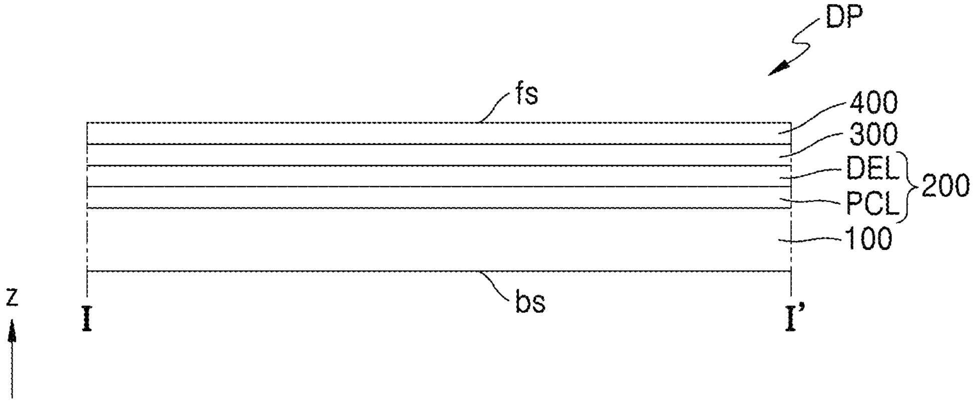
FIGS. 3A to 3C are schematic cross-sectional views of a display panel according to one or more embodiments.
Figure 3B:
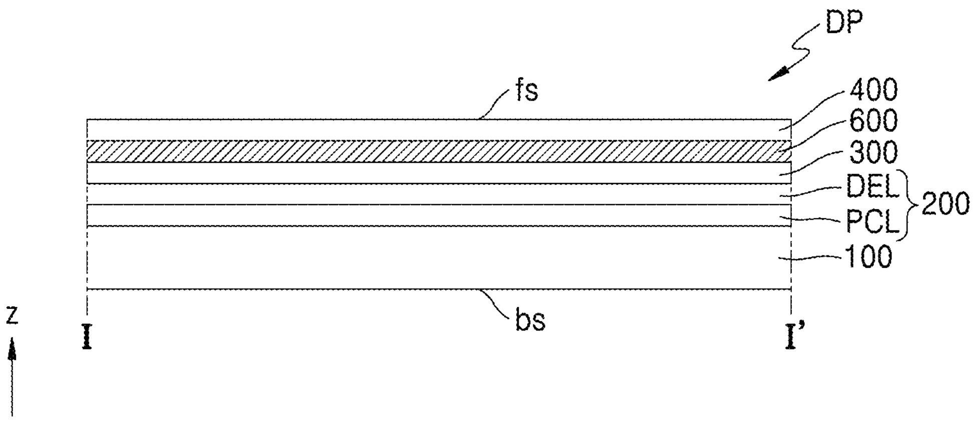
Figure 3C:
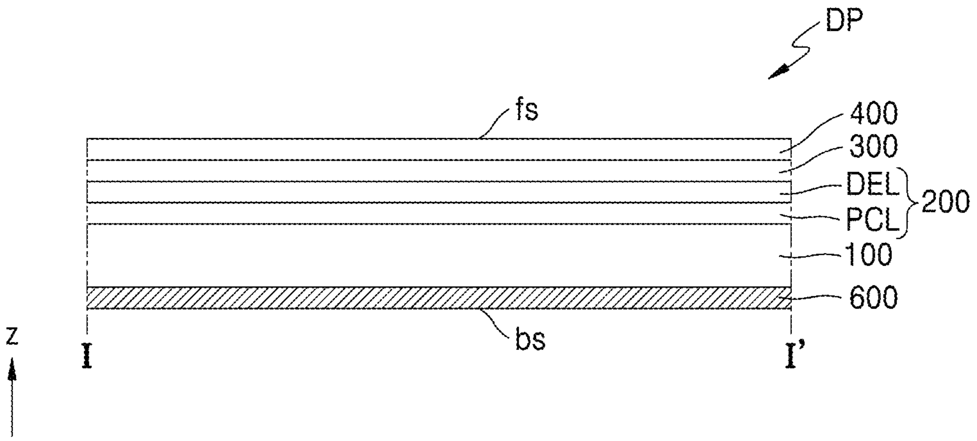

FIGS. 3A to 3C are schematic cross-sectional views of the display panel DP according to one or more embodiments.

Referring to FIGS. 3A to 3C, the display panel DP may include a first surface fs and a second surface bs facing the first surface fs. For convenience of description, in the display panel DP, when a first component is located closer to the first surface fs than a second component, the first component may be referred to as being located above the second component. Likewise, when the second component is located closer to the second surface bs than the first component, the second component may be referred to as being located below the first component. The display panel DP may include a substrate 100, a display layer 200, an encapsulation layer 300, and a touch sensor layer 400.

The substrate 100 may include a stretchable material, for example, stretchable polymer resin. In some embodiments, the substrate 100 may include an elastomer. The elastomer may include an organic elastomer, an organic-inorganic elastomer, or a combination thereof. For example, the substrate 100 may include a silicon-based elastomer, such as polydimethylsiloxane, a styrene-based elastomer, an olefin-based elastomer, polyurethane, or a mixture thereof. The substrate 100 may have a single-layer or multi-layer structure.

The display layer 200 may be located on the substrate 100. The display layer 200 may include pixels, and may be a layer for displaying an image. The display layer 200 may include a pixel-driving circuit layer PCL, and a light-emitting element layer DEL on the pixel-driving circuit layer PCL. The pixel-driving circuit layer PCL may include signal lines, such as scan lines, data lines, and power lines, transistors, and driving circuits. The light-emitting element layer DEL may include light-emitting elements.

A light-emitting element may include an emission layer. The emission layer of the light-emitting element may include an organic material, an inorganic material, a quantum dot, an organic material and a quantum dot, an inorganic material and a quantum dot, or an organic material, an inorganic material, and a quantum dot. In one or more embodiments, the light-emitting element may be a light-emitting diode.

The encapsulation layer 300 may be located on the display layer 200 to seal the light-emitting elements. In some embodiments, the encapsulation layer 300 may include a structure in which an inorganic encapsulation layer including an inorganic insulating material and an organic encapsulation layer including an organic insulating material are stacked. In one or more other embodiments, the encapsulation layer 300 may include an organic material, such as resin, and may be a single layer including the above-described organic material. In some embodiments, the encapsulation layer 300 may include urethane epoxy acrylate. The encapsulation layer 300 may include a photosensitive material, for example, photoresist.

The touch sensor layer 400 may be located on the encapsulation layer 300. The touch sensor layer 400 may include touch electrodes, touch signal lines, and touch-insulating layers located below and/or above the touch electrodes. A display apparatus may measure the amount of change in capacitance of the touch electrodes to detect the presence or absence of a user's touch input and a touch position.

In some embodiments, the touch sensor layer 400 may be formed through a continuous process with the encapsulation layer 300. For example, the touch sensor layer 400 may be formed directly on a base surface provided by the encapsulation layer 300. In one or more other embodiments, the touch sensor layer 400 may be composed of a separate panel, and may be attached to the encapsulation layer 300 by using an adhesive or the like.

The display panel DP may include a strain sensor. The strain sensor may include layers, patterns, or wires of which a measurable physical quantity changes according to stretching of the display panel DP. For example, the strain sensor may include wires of which the resistance and/or capacitance changes according to stretching of the display panel DP. In one or more other embodiments, the strain sensor may include an optical layer or optical pattern of which the transmittance and/or reflectance changes according to stretching of the display panel DP.

In one or more embodiments, the strain sensor may be provided in the display layer 200, and some of wires included in the pixel-driving circuit layer PCL may be used as the strain sensor. For example, a display apparatus may detect stretching of the display panel DP by using changes in resistance and/or capacitance of data lines, scan lines, and/or power lines.

In one or more other embodiments, the strain sensor may be provided in the touch sensor layer 400, and some of conductive patterns included in the touch sensor layer 400 may be used as the strain sensor. For example, the touch electrodes included in the touch sensor layer 400 may be used as the strain sensor. A display apparatus may detect stretching of the display panel DP by using changes in resistance and/or capacitance of the touch electrodes.

In some embodiments, the display panel DP may further include a strain sensor layer 600 including a strain sensor. For example, as shown in FIG. 3B, the strain sensor layer 600 may be arranged between the encapsulation layer 300 and the touch sensor layer 400. In one or more other embodiments, as shown in FIG. 3C, the strain sensor layer 600 may be arranged on a rear surface of the substrate 100, for example, on the second surface bs of the display panel DP.

Figure 4:
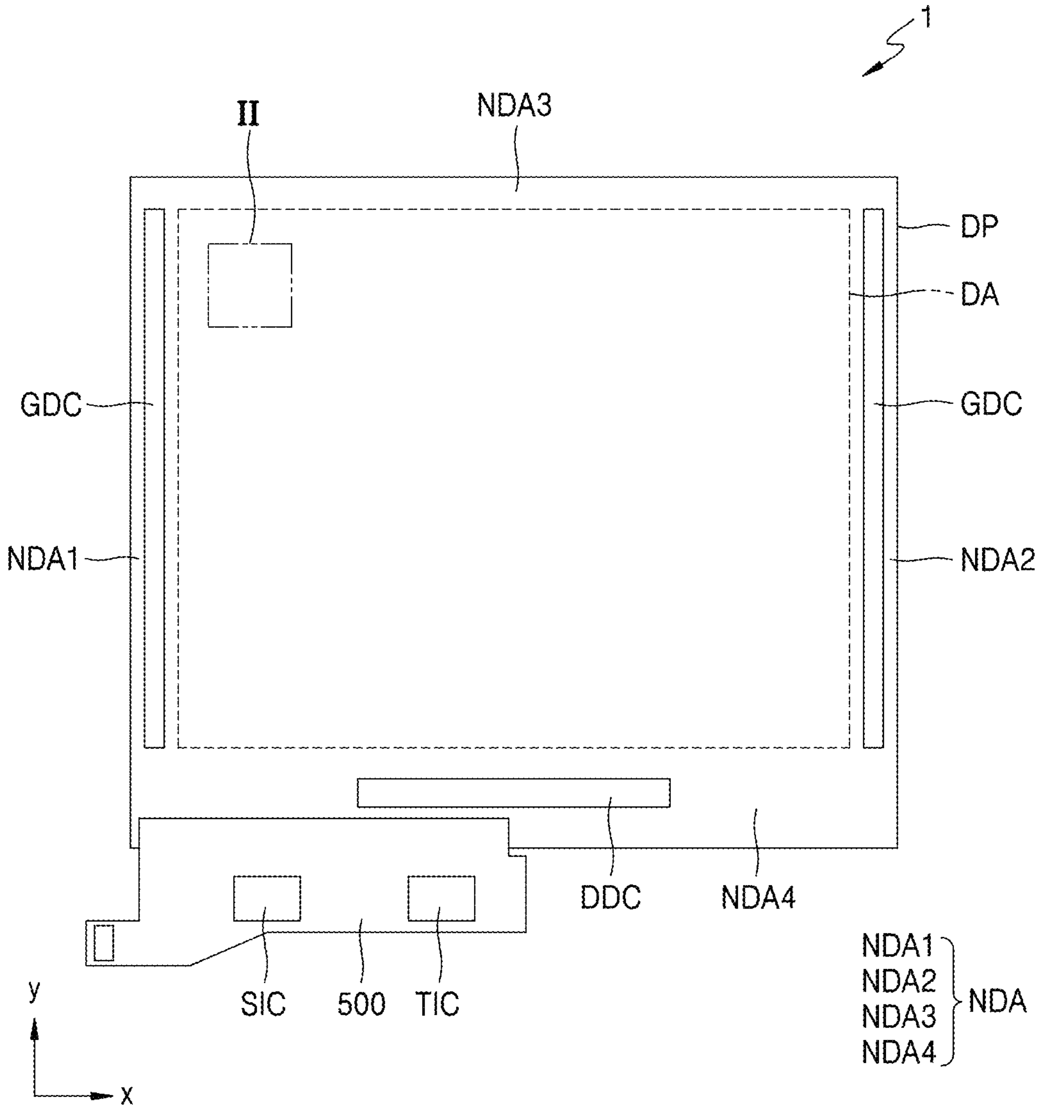
FIG. 4 is a schematic plan view of a display apparatus according to one or more embodiments.

FIG. 4 is a schematic plan view of a display apparatus 1 according to one or more embodiments.

Referring to FIG. 4, the display apparatus 1 may include the display panel DP and a circuit board 500. A plurality of pixels may be arranged in the display area DA of the display panel DP. Each pixel may include sub-pixels emitting light of different colors. Light-emitting elements respectively corresponding to the sub-pixels may be arranged in the display area DA.

In the non-display area NDA surrounding the display area DA, there may be arranged circuits for providing electrical signals to the light-emitting elements arranged in the display area DA, and transistors electrically connected to the light-emitting elements. A gate-driving circuit GDC may be arranged in each of a first non-display area NDA1 and a second non-display area NDA2, which are respectively arranged on opposite sides of the display area DA. The gate-driving circuit GDC may include drivers for providing electrical signals to gate electrodes of the transistors electrically connected to the light-emitting elements. FIG. 4 shows that the gate-driving circuit GDC is arranged in each of the first non-display area NDA1 and the second non-display area NDA2, but the disclosure is not limited thereto. In one or more other embodiments, the gate-driving circuit GDC may be arranged in any one of the first non-display area NDA1 and the second non-display area NDA2.

A data-driving circuit DDC may be arranged in a third non-display area NDA3 and/or a fourth non-display area NDA4, which connect the first non-display area NDA1 and the second non-display area NDA2 to each other. In one or more embodiments, FIG. 4 shows that the data-driving circuit DDC is arranged in the fourth non-display area NDA4. In one or more other embodiments, the data-driving circuit DDC may be arranged in each of the third non-display area NDA3 and the fourth non-display area NDA4.

The circuit board 500 may be arranged at one end of the fourth non-display area NDA4. The circuit board 500 may overlap a pad portion arranged at one end of the display panel DP (e.g., at one end of the fourth non-display area NDA4), and may be electrically connected to the above-described pad portion, or may be electrically connected to the above-described pad portion via a flexible circuit film. The circuit board 500 may include a main processor suitable for an operation of the display apparatus 1 for expressing an image, a touch circuit TIC for operating a touch sensor, and a sensor circuit SIC for operating a strain sensor. In one or more embodiments, the main processor and the touch circuit TIC may be provided as touch display driver integration (TDDI) chips.

FIG. 4 shows that the data-driving circuit DDC is arranged in the fourth non-display area NDA4 of the display apparatus 1, but the disclosure is not limited thereto. In one or more other embodiments, the data-driving circuit DDC may be located on the circuit board 500 described above.

In some embodiments, when the display panel DP is deformed as shown in FIGS. 2A to 2E, the non-display area NDA may have an elongation rate about equal to or less than that of the display area DA. In one or more embodiments, the non-display area NDA may have a different elongation rate for each area. For example, the first non-display area NDA1, the second non-display area NDA2, and the third non-display area NDA3 may have substantially the same elongation rate, but the fourth non-display area NDA4 may have an elongation rate that is less than those of the first non-display area NDA1, the second non-display area NDA2, and the third non-display area NDA3. In one or more embodiments, the display area DA may include a plurality of areas having different elongation rates.

Figure 5A:
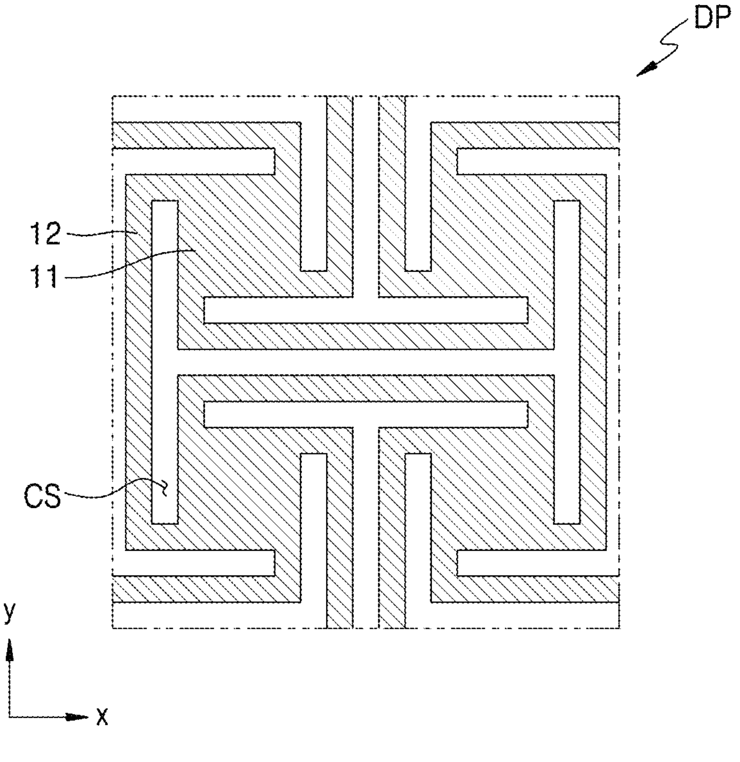
FIGS. 5A and 5B are schematic plan views of a portion of a display panel according to one or more embodiments.
Figure 5B:
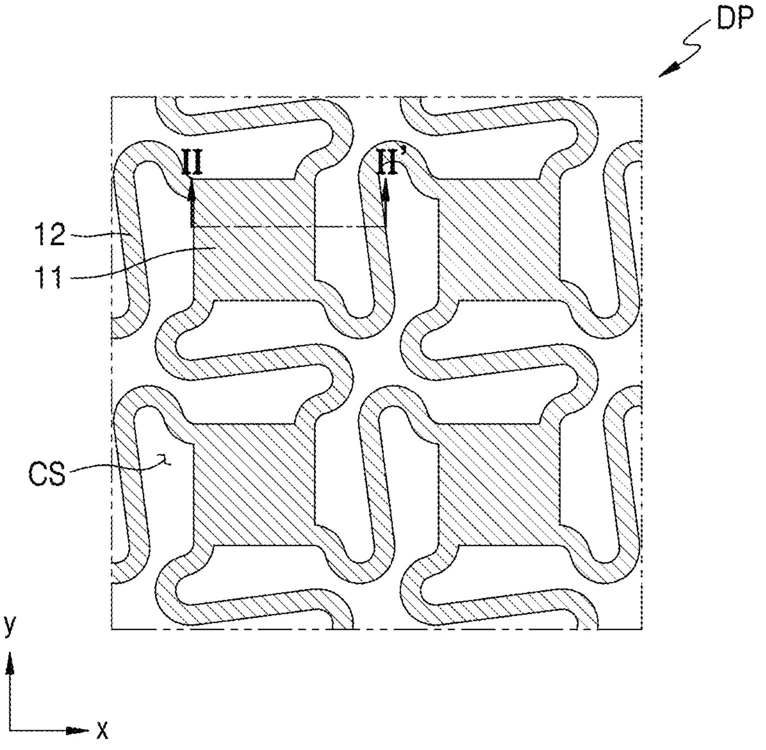
Figure 5C:
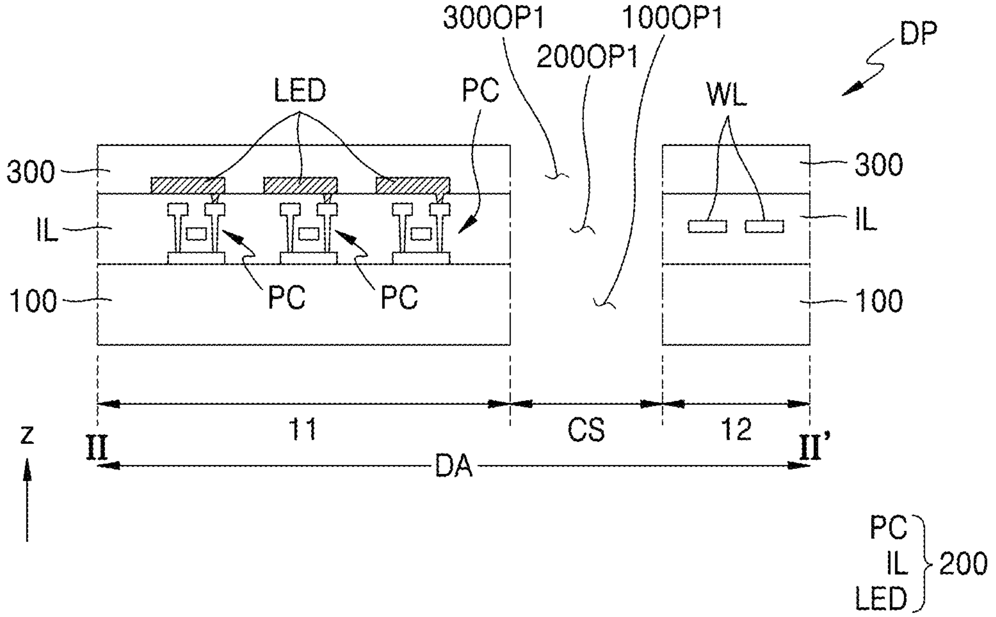
FIG. 5C is a schematic cross-sectional view of a portion of a display panel according to one or more embodiments.

FIGS. 5A and 5B are schematic plan views of a portion of the display panel DP according to one or more embodiments, and FIG. 5C is a schematic cross-sectional view of a portion of the display panel DP according to one or more embodiments.

Referring to FIG. 5A, the display panel DP may include first pixel portions 11 spaced apart from each other in the first direction (e.g., the x direction or the −x direction) and in the second direction (e.g., the y direction or the −y direction) in the display area DA, and first bridge portions 12 connecting adjacent ones of the first pixel portions 11 to each other.

The first pixel portion 11 may include at least one unit pixel. The unit pixel may be the smallest repeating unit of sub-pixels having a corresponding arrangement. In some embodiments, sub-pixels arranged in the first pixel portion 11 may have a diamond PenTile® arrangement (PenTile® being a registered trademark of Samsung Display Co., Ltd., Republic of Korea), and one unit pixel may include one blue sub-pixel, one red sub-pixel, and two green sub-pixels. In one or more other embodiments, sub-pixels arranged in the first pixel portion 11 may have a stripe-type arrangement, and one unit pixel may include one blue sub-pixel, one red sub-pixel, and one green sub-pixel.

Each first pixel portion 11 may be connected to a plurality of first bridge portions 12. For example, each first pixel portion 11 may be connected to four first bridge portions 12. Two of the four first bridge portions 12 may be respectively arranged on opposite sides of the first pixel portion 11 in the first direction (e.g., the x direction or the −x direction), and the remaining two of the four first bridge portions 12 may be respectively arranged on opposite sides of the first pixel portion 11 in the second direction (e.g., the y direction or the −y direction). In one or more embodiments, the four first bridge portions 12 may be respectively connected to four sides of the first pixel portion 11. The four first bridge portions 12 may be respectively adjacent to corners of the first pixel portion 11.

The first bridge portions 12 may be spaced apart from each other by an opening CS located between the first bridge portions 12. In one or more embodiments, an opening CS having an approximately H shape, and an opening CS having an approximately I shape (e.g., the above-described H shape rotated by 90 degrees), may be alternately and repeatedly arranged in the first direction (e.g., the x direction or the −x direction) and in the second direction (e.g., the y direction or the −y direction). Both ends of each first bridge portion 12 may be respectively connected to adjacent ones of the first pixel portions 11, and one side of each first bridge portion 12 may be spaced apart from one side of one of the adjacent ones of the first pixel portions 11 and/or one side of another first bridge portion 12 by the opening CS.

Referring to FIG. 5B, the display panel DP may include the first pixel portions 11 spaced apart from each other in the first direction (e.g., the x direction or the −x direction) and in the second direction (e.g., the y direction or the −y direction) in the display area DA, and the first bridge portions 12 connecting adjacent ones of the first pixel portions 11 to each other.

The first bridge portions 12 may be spaced apart from each other by the opening CS located between the first bridge portions 12. The first bridge portion 12 may have a serpentine shape. For example, as shown in FIG. 5B, the first bridge portion 12 may have an approximately S shape.

Each first pixel portion 11 may be connected to a plurality of first bridge portions 12. For example, each first pixel portion 11 may be connected to four first bridge portions 12. Two first ones of the four first bridge portions 12 may be respectively arranged on opposite sides of the first pixel portion 11 in the first direction (e.g., the x direction or the −x direction), and the remaining two of the four first bridge portions 12 may be respectively arranged on opposite sides of the first pixel portion 11 in the second direction (e.g., the y direction or the −y direction). The four first bridge portions 12 may be respectively connected to four sides of the first pixel portion 11. The four first bridge portions 12 may be respectively adjacent to corners of the first pixel portion 11.

FIGS. 5A and 5B each show the first pixel portion 11 and the first bridge portion 12 of the display area DA. In one or more embodiments, the display panel DP may include a second pixel portion and a second bridge portion in the non-display area NDA. In one or more embodiments, the second pixel portion and the second bridge portion of the non-display area NDA may have shapes that are different from those of the first pixel portion 11 and the first bridge portion 12 of the display area DA, respectively. In one or more other embodiments, the second pixel portion and the second bridge portion of the non-display area NDA may have shapes that are identical to those of the first pixel portion 11 and the first bridge portion 12 of the display area DA, respectively.

FIG. 5C schematically shows a cross-section of the display panel DP of FIG. 5B, taken along the line II-II' of FIG. 5B.

Referring to FIG. 5C, the first pixel portion 11 and the first bridge portion 12 arranged in the display area DA may be spaced apart from each other with the opening CS therebetween. The first pixel portion 11 may include light-emitting elements LED and circuits, for example, pixel-driving circuits PC, electrically connected to the light-emitting elements LED to drive the light-emitting elements LED, and the first bridge portion 12 may include wires WL electrically connected to the pixel-driving circuits PC respectively arranged in adjacent ones of the first pixel portions 11.

In the first pixel portion 11, the display layer 200 may be located on the substrate 100. The display layer 200 may include the pixel-driving circuit PC, an insulating layer IL, and the light-emitting element LED. The pixel-driving circuit PC and the insulating layer IL may be located on the substrate 100. The insulating layer IL may include an inorganic insulating material and/or an organic insulating material. The light-emitting element LED may be located on the insulating layer IL, and may be electrically connected to the pixel-driving circuit PC corresponding to the light-emitting element LED. The light-emitting elements LED may emit light of different colors or light of the same color. In one or more embodiments, the light-emitting elements LED may emit red light, green light, and blue light, respectively. In some embodiments, the light-emitting elements LED may emit white light. In one or more other embodiments, the light-emitting elements LED may emit red light, green light, blue light, and white light, respectively.

In one or more embodiments, as shown in FIG. 5C, three pixel-driving circuits PC, and three light-emitting elements LED respectively connected to the pixel-driving circuits PC, may be arranged in each first pixel portion 11, but the disclosure is not limited thereto. In one or more other embodiments, the number of pixel-driving circuits PC and the number of light-emitting elements LED arranged in the first pixel portion 11 may each be one, two, or four or more.

The encapsulation layer 300 may be located on the light-emitting element LED, and may protect the light-emitting element LED from an external force and/or moisture penetration.

In the first bridge portion 12, the insulating layer IL including an organic insulating material may be located on the substrate 100. If the stretchable display apparatus 1 is stretched, the first bridge portion 12, which is subject to relatively high deformation, may not have a layer including an inorganic insulating material that is prone to cracking.

In one or more embodiments, the substrate 100 corresponding to the first bridge portion 12 may have a stacked structure that is identical to that of the substrate 100 corresponding to the first pixel portion 11. In one or more embodiments, the substrate 100 corresponding to the first bridge portion 12 and the substrate 100 corresponding to the first pixel portion 11 may be polymer resin layers formed together in the same process. In one or more other embodiments, a substrate 100 corresponding to the first bridge portion 12 may have a stacked structure that is different from that of a substrate 100 corresponding to the first pixel portion 11. In some embodiments, the substrate 100 corresponding to the first bridge portion 12 may have a multi-layer structure including a base layer including polymer resin, and a barrier layer including an inorganic insulating material, and the substrate 100 corresponding to the first bridge portion 12 may have a structure including a polymer resin layer without a layer including an inorganic insulating material.

As described above, the wires WL of the first bridge portion 12 may be signal lines (e.g., gate lines, data lines, etc.) for providing an electrical signal to a transistor included in the pixel-driving circuit PC of the first pixel portion 11, or may be voltage lines (e.g., driving voltage lines, initialization voltage lines, etc.) for providing a voltage to a transistor included in the pixel-driving circuit PC of the first pixel portion 11. The encapsulation layer 300 may also be located in the first bridge portion 12. In one or more other embodiments, the encapsulation layer 300 may not be present in the first bridge portion 12.

The first pixel portion 11 and the first bridge portion 12 may be spaced apart from each other by the opening CS. The opening CS may include an opening 100OP1 of the substrate 100, an opening 200OP1 of the display layer 200, and an opening 300OP1 of the encapsulation layer 300, which are arranged to overlap each other.

Although omitted in FIG. 5C, the touch sensor layer 400 including touch electrodes and touch-insulating layers may be located on the encapsulation layer 300. In some embodiments, the display panel DP may further include the strain sensor layer 600, as described with reference to FIGS. 3B and 3C.

Figure 6A:
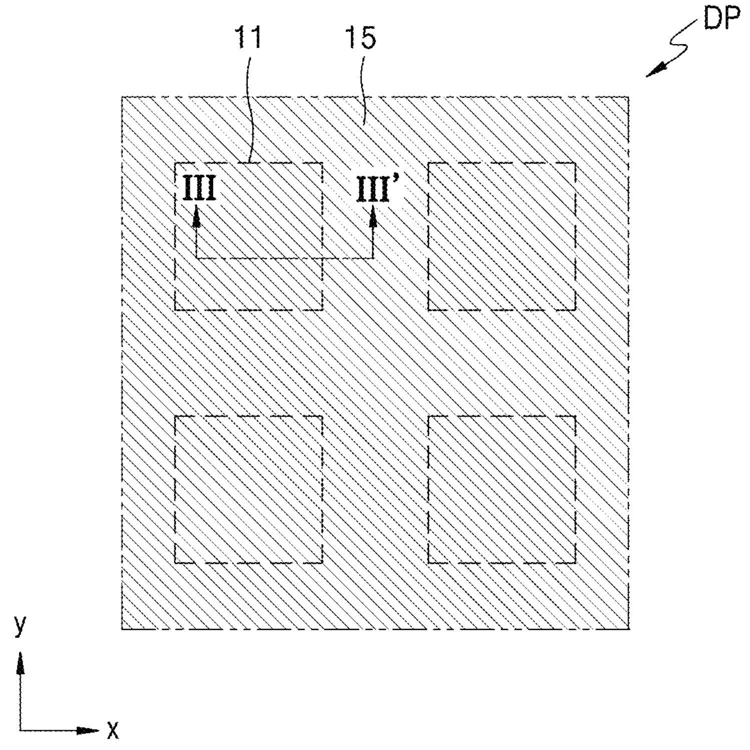
FIG. 6A is a schematic plan view of a portion of a display panel according to one or more embodiments.
Figure 6B:
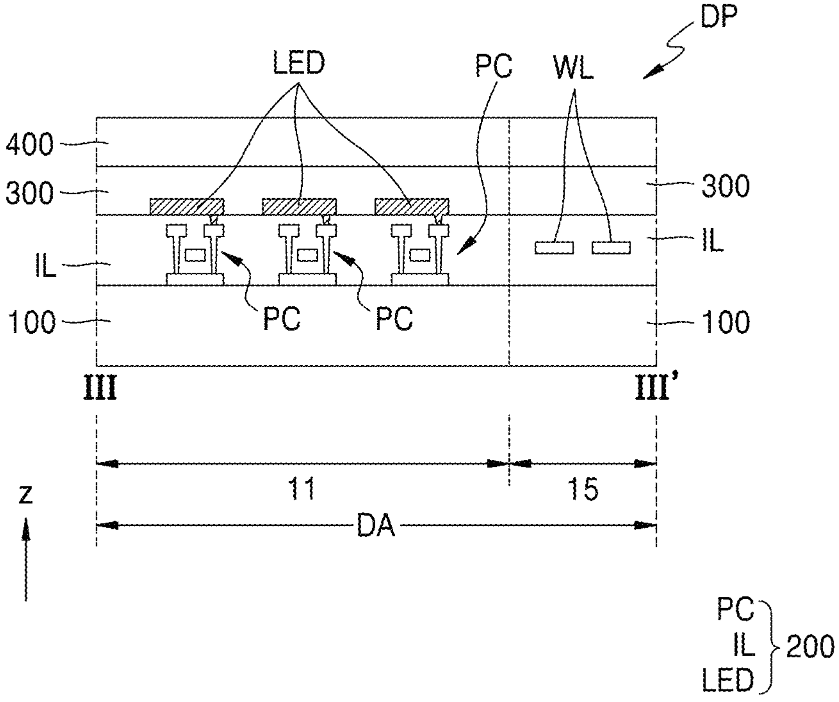
FIG. 6B is a schematic cross-sectional view of a portion of a display panel according to one or more embodiments.

FIG. 6A is a schematic plan view of a portion of the display panel DP according to one or more embodiments, and FIG. 6B is a schematic cross-sectional view of a portion of the display panel DP according to one or more embodiments.

Referring to FIGS. 6A and 6B, the display panel DP may include the first pixel portions 11 spaced apart from each other in the first direction (e.g., the x direction or the −x direction) and in the second direction (e.g., the y direction or the −y direction), and also may include peripheral portions 15 connecting adjacent ones of the first pixel portions 11 to each other. The peripheral portion 15 may be an area between the first pixel portions 11, and may be an area through which the wires WL pass. The wires WL may be signal lines (e.g., gate lines, data lines, etc.) for providing an electrical signal to a transistor included in the pixel-driving circuit PC of the first pixel portion 11, or may be voltage lines (e.g., driving voltage lines, initialization voltage lines, etc.) for providing a voltage to a transistor included in the pixel-driving circuit PC of the first pixel portion 11.

In one or more embodiments, the substrate 100 may include an elastomer. In this case, the display panel DP may be stretched without a separate opening between the first pixel portion 11 and the peripheral portion 15. In one or more embodiments, the first pixel portion 11 may not be stretched, or may be stretched less than the peripheral portion 15. In this case, if the display panel DP is deformed, the peripheral portion 15 may have an elongation rate that is greater than that of the first pixel portion 11. In one or more other embodiments, if the display panel DP is deformed, the first pixel portion 11 and the peripheral portion 15 may have substantially the same elongation rate.

Figure 7A:
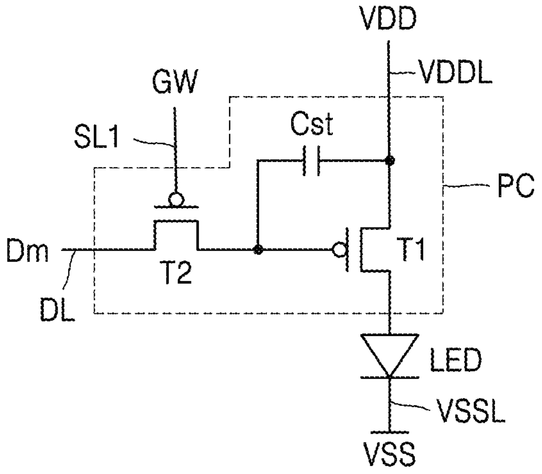
FIGS. 7A to 7C are equivalent circuit diagrams of a sub-pixel included in a display apparatus according to one or more embodiments.
Figure 7B:
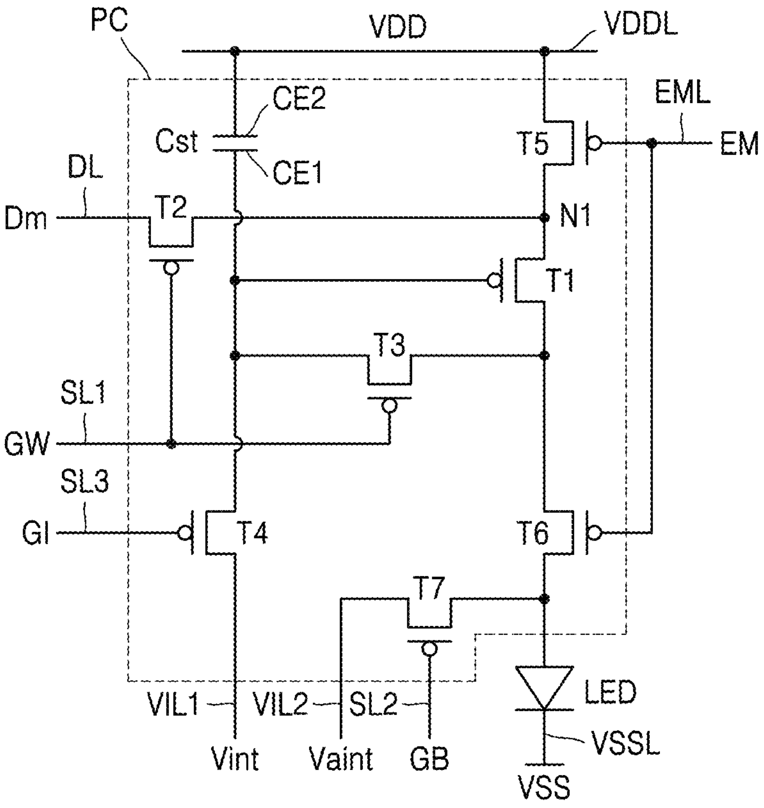
Figure 7C:
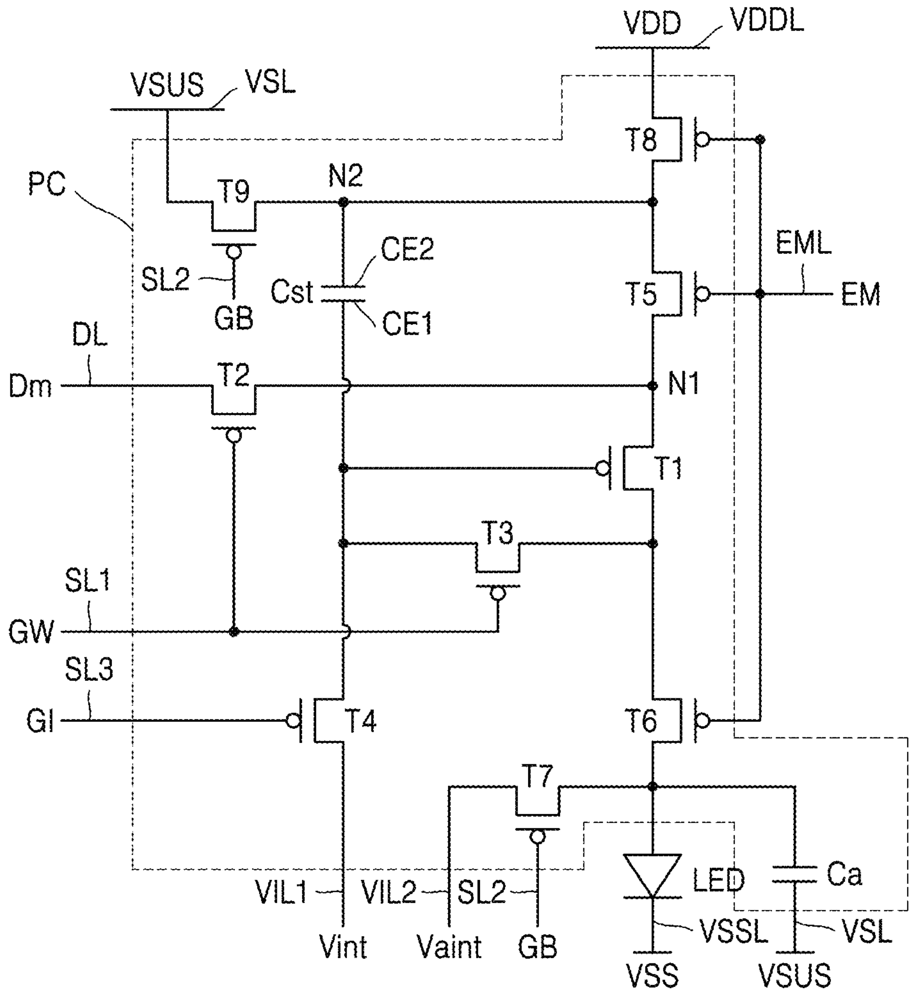

FIGS. 7A to 7C are equivalent circuit diagrams of a sub-pixel included in a display apparatus according to one or more embodiments.

Referring to FIG. 7A, the light-emitting element LED corresponding to the sub-pixel may be electrically connected to the pixel-driving circuit PC, and the pixel-driving circuit PC may include a first transistor T1, a second transistor T2, and a storage capacitor Cst. The pixel-driving circuit PC may be electrically connected to a signal line and a voltage line. The signal line may include a gate line, such as a first scan line SL1, and a data line DL, and the voltage line may include a first voltage line (a driving power voltage line) VDDL.

The second transistor T2 may be electrically connected to the first scan line SL1 and the data line DL. The first scan line SL1 may be configured to provide a first scan signal GW to a gate electrode of the second transistor T2. The second transistor T2 may be a switching transistor that is turned on or off according to the first scan signal GW input from the first scan line SL1. The second transistor T2 may be electrically connected to the first transistor T1, and may be configured to transmit a data signal Dm input from the data line DL to the first transistor T1.

The storage capacitor Cst may be electrically connected to the second transistor T2 and the first voltage line VDDL, and may store a voltage corresponding to the difference between a voltage received from the second transistor T2 and a first power voltage VDD supplied by the first voltage line VDDL.

The first transistor T1 may be a driving transistor, and may control a driving current flowing through the light-emitting element LED. The first transistor T1 may be connected to the first voltage line VDDL and the storage capacitor Cst. The first transistor T1 may control a driving current flowing from the first voltage line VDDL to the light-emitting element LED in response to a voltage value stored in the storage capacitor Cst. The light-emitting element LED may emit light having a corresponding luminance according to the driving current. A first electrode (an anode) of the light-emitting element LED may be electrically connected to the first transistor T1, and a second electrode (a cathode) of the light-emitting element LED may be electrically connected to a second voltage line VSSL configured to supply a second power voltage (a common power voltage) VSS.

Although FIG. 7A shows that the pixel-driving circuit PC includes two transistors and one storage capacitor, in other embodiments, the pixel-driving circuit PC may include three or more transistors.

Referring to FIG. 7B, the pixel-driving circuit PC may include the first transistor T1, the second transistor T2, a third transistor T3, a fourth transistor T4, a fifth transistor T5, a sixth transistor T6, a seventh transistor T7, and the storage capacitor Cst. The pixel-driving circuit PC may be electrically connected to signal lines and voltage lines. The signal lines may include gate lines, such as the first scan line SL1, a second scan line SL2, a third scan line SL3, and an emission control line EML, and may include the data line DL. The voltage lines may include a first initialization voltage line VIL1, a second initialization voltage line VIL2, and the first voltage line VDDL.

The first voltage line VDDL may be configured to transmit the first power voltage VDD to the first transistor T1. The first initialization voltage line VIL1 may be configured to transmit a first initialization voltage Vint for initializing the first transistor T1 to the pixel-driving circuit PC. The second initialization voltage line VIL2 may be configured to transmit a second initialization voltage Vaint for initializing the first electrode of the light-emitting element LED to the pixel-driving circuit PC.

The first transistor T1 may be electrically connected to the first voltage line VDDL via the fifth transistor T5, and may be electrically connected to the light-emitting element LED via the sixth transistor T6. The first transistor T1 may serve as a driving transistor, and may be configured to receive the data signal Dm according to a switching operation of the second transistor T2, and may supply a driving current to the light-emitting element LED.

The second to seventh transistors T2 to T7 may be switching transistors that are turned on or off according to a gate-source voltage or a gate voltage.

The second transistor T2 may be a data-writing transistor, and may be electrically connected to the first scan line SL1 and the data line DL. The second transistor T2 may be electrically connected to the first voltage line VDDL via the fifth transistor T5. The second transistor T2 may be turned on according to the first scan signal GW received through the first scan line SL1, and may be configured to perform a switching operation of transmitting the data signal Dm transmitted through the data line DL to a first node N1.

The third transistor T3 may be electrically connected to the first scan line SL1, and may be electrically connected to the light-emitting element LED via the sixth transistor T6. The third transistor T3 may be turned on according to the first scan signal GW received through the first scan line SL1 to diode-connect the first transistor T1.

The fourth transistor T4 may be a first initialization transistor, and may be electrically connected to the third scan line SL3, and to the first initialization voltage line VIL1. The fourth transistor T4 may be turned on according to a third scan signal GI received through the third scan line SL3, and may be configured to transmit the first initialization voltage Vint from the first initialization voltage line VIL1 to a gate electrode of the first transistor T1 to initialize a voltage of the gate electrode of the first transistor T1. The third scan signal GI may correspond to a first scan signal of another pixel-driving circuit arranged in a previous row of the pixel-driving circuit PC.

The fifth transistor T5 may be an operation control transistor, and the sixth transistor T6 may be an emission control transistor. The fifth transistor T5 and the sixth transistor T6 may be electrically connected to the emission control line EML, and may be concurrently or substantially simultaneously turned on according to an emission control signal EM received through the emission control line EML to form a current path, and thus, a driving current may flow from the first voltage line VDDL to the light-emitting element LED.

The seventh transistor T7 may be a second initialization transistor, and may be electrically connected to the second scan line SL2, the second initialization voltage line VIL2, and the sixth transistor T6. The seventh transistor T7 may be turned on according to a second scan signal GB received through the second scan line SL2, and may be configured to transmit the second initialization voltage Vaint from the second initialization voltage line VIL2 to the first electrode of the light-emitting element LED to initialize the first electrode of the light-emitting element LED.

The storage capacitor Cst may include a first capacitor electrode CE1 and a second capacitor electrode CE2. The first capacitor electrode CE1 may be electrically connected to the gate electrode of the first transistor T1, and the second capacitor electrode CE2 may be electrically connected to the first voltage line VDDL. The storage capacitor Cst may store and maintain a voltage corresponding to the difference between voltages of the first voltage line VDDL and the gate electrode of the first transistor T1, thereby maintaining a voltage applied to the gate electrode of the first transistor T1.

Referring to FIG. 7C, the pixel-driving circuit PC may include the first transistor T1, the second transistor T2, the third transistor T3, the fourth transistor T4, the fifth transistor T5, the sixth transistor T6, the seventh transistor T7, an eighth transistor T8, a ninth transistor T9, the storage capacitor Cst, and an auxiliary capacitor Ca.

The pixel-driving circuit PC may be electrically connected to signal lines and voltage lines. The signal lines may include gate lines, such as the first scan line SL1, the second scan line SL2, the third scan line SL3, and the emission control line EML, and also may include the data line DL. The voltage lines may include the first and second initialization voltage lines VIL1 and VIL2, a sustain voltage line VSL, and the first voltage line VDDL.

The first voltage line VDDL may be configured to transmit the first power voltage VDD to the first transistor T1. The first initialization voltage line VIL1 may be configured to transmit the first initialization voltage Vint for initializing the first transistor T1 to the pixel-driving circuit PC. The second initialization voltage line VIL2 may be configured to transmit the second initialization voltage Vaint for initializing the first electrode of the light-emitting element LED to the pixel-driving circuit PC. The sustain voltage line VSL may be configured to provide a sustain voltage VSUS to a second node N2 (e.g., to the second capacitor electrode CE2 of the storage capacitor Cst) in an initialization section and a data-writing section.

The first transistor T1 may be electrically connected to the first voltage line VDDL via the fifth transistor T5, and the eighth transistor T8 may be electrically connected to the light-emitting element LED via the sixth transistor T6. The first transistor T1 may serve as a driving transistor, and may be configured to receive the data signal Dm according to a switching operation of the second transistor T2, and may supply a driving current to the light-emitting element LED.

The second to ninth transistors T2 to T9 may be switching transistors that are turned on or off according to a gate-source voltage or a gate voltage.

The second transistor T2 may be electrically connected to the first scan line SL1 and the data line DL, and may be electrically connected to the first voltage line VDDL via the fifth transistor T5 and the eighth transistor T8. The second transistor T2 may be turned on according to the first scan signal GW received through the first scan line SL1, and may be configured to perform a switching operation of transmitting the data signal Dm transmitted through the data line DL to the first node N1.

The third transistor T3 may be electrically connected to the first scan line SL1, and may be electrically connected to the light-emitting element LED via the sixth transistor T6. The third transistor T3 may be turned on according to the first scan signal GW received through the first scan line SL1 to diode-connect the first transistor T1, thereby compensating for a threshold voltage of the first transistor T1.

The fourth transistor T4 may be electrically connected to the third scan line SL3 and the first initialization voltage line VIL1, may be turned on according to the third scan signal GI received through the third scan line SL3, and may be configured to transmit the first initialization voltage Vint from the first initialization voltage line VIL1 to the gate electrode of the first transistor T1 to initialize a voltage of the gate electrode of the first transistor T1. The third scan signal GI may correspond to a first scan signal of another pixel-driving circuit arranged in a previous row of the pixel-driving circuit PC.

The fifth transistor T5, the sixth transistor T6, and the eighth transistor T8 may be electrically connected to the emission control line EML, and may be concurrently or substantially simultaneously turned on according to the emission control signal EM received through the emission control line EML to form a current path, and thus, a driving current may flow from the first voltage line VDDL to the light-emitting element LED.

The seventh transistor T7 may be a second initialization transistor, and may be electrically connected to the second scan line SL2, the second initialization voltage line VIL2, and the sixth transistor T6. The seventh transistor T7 may be turned on according to the second scan signal GB received through the second scan line SL2, and may be configured to transmit the second initialization voltage Vaint from the second initialization voltage line VIL2 to the first electrode of the light-emitting element LED to initialize the first electrode of the light-emitting element LED.

The ninth transistor T9 may be electrically connected to the second scan line SL2, the second capacitor electrode CE2 of the storage capacitor Cst, and the sustain voltage line VSL. The ninth transistor T9 may be turned on according to the second scan signal GB received through the second scan line SL2, and may be configured to transmit the sustain voltage VSUS to the second node N2 (e.g., to the second capacitor electrode CE2 of the storage capacitor Cst) in an initialization section and a data-writing section.

The eighth transistor T8 and the ninth transistor T9 may each be electrically connected to the second node N2, for example, the second capacitor electrode CE2 of the storage capacitor Cst. In some embodiments, in an initialization section and a data-writing section, the eighth transistor T8 may be turned off and the ninth transistor T9 may be turned on. In an emission section, the eighth transistor T8 may be turned on and the ninth transistor T9 may be turned off. In an initialization section and a data-writing section, the sustain voltage VSUS may be transmitted to the second node N2, and thus, the luminance uniformity (e.g., long range uniformity (LRU)) of the display apparatus according to a voltage drop of the first voltage line VDDL may be improved.

The storage capacitor Cst may include the first capacitor electrode CE1 and the second capacitor electrode CE2. The first capacitor electrode CE1 may be electrically connected to the gate electrode of the first transistor T1, and the second capacitor electrode CE2 may be electrically connected to the eighth transistor T8 and the ninth transistor T9.

The auxiliary capacitor Ca may be electrically connected to the sixth transistor T6/the first electrode of the light-emitting element LED and to the sustain voltage line VSL. The auxiliary capacitor Ca may store and maintain a voltage corresponding to the difference between voltages of the first electrode of the light-emitting element LED and the sustain voltage line VSL while the seventh transistor T7 and the ninth transistor T9 are turned on, and thus, an increase in black luminance may be reduced or prevented if the sixth transistor T6 is turned off.

Figure 8A:
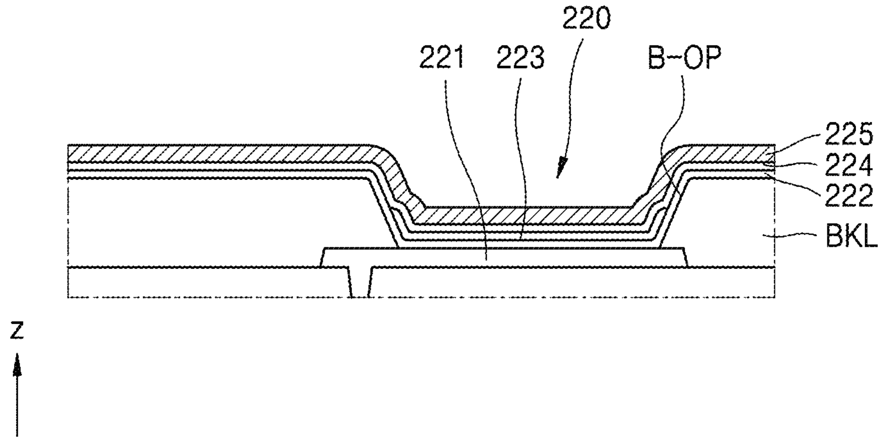
FIGS. 8A and 8B are schematic cross-sectional views of a light-emitting element of a display apparatus according to one or more embodiments.
Figure 8B:
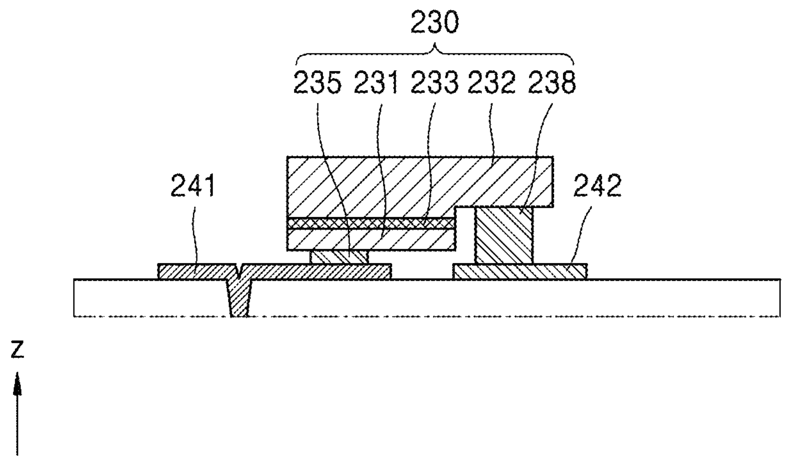

FIGS. 8A and 8B are schematic cross-sectional views of a light-emitting element of a display apparatus according to one or more embodiments.

Referring to FIG. 8A, the light-emitting element according to one or more embodiments may be an organic light-emitting diode 220 including an organic material. The organic light-emitting diode 220 may include a first electrode 221 located on the insulating layer IL (see FIG. 5C), a second electrode 225 facing the first electrode 221, and an emission layer 223 arranged between the first electrode 221 and the second electrode 225. A first functional layer 222 may be arranged between the first electrode 221 and the emission layer 223, and a second functional layer 224 may be arranged between the emission layer 223 and the second electrode 225.

An edge of the first electrode 221 may be covered with a bank layer BKL including an insulating material. The bank layer BKL may include an opening B-OP overlapping a central portion of the first electrode 221.

The first electrode 221 may include a conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). In one or more other embodiments, the first electrode 221 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. In one or more other embodiments, the first electrode 221 may further include a layer including ITO, IZO, ZnO, AZO, or $In_2O_3$ above/below the above-described reflective layer.

The emission layer 223 may include a polymer or low-molecular weight organic material for emitting light of a corresponding color. The first functional layer 222 may include a hole transport layer and/or a hole injection layer. The second functional layer 224 may include an electron transport layer and/or an electron injection layer.

The second electrode 225 may include a conductive material having a low work function. For example, the second electrode 225 may include a transparent or semi-transparent layer including Ag, Mg, Al, Pt, Pd, Au, Ni, Nd, Ir, Cr, lithium (Li), calcium (Ca), or an alloy thereof. Alternatively, the second electrode 225 may include a layer including ITO, IZO, ZnO, AZO, or $In_2O_3$ on the transparent/semi-transparent layer including the above-described material.

Referring to FIG. 8B, in one or more embodiments, the light-emitting element may include an inorganic light-emitting diode 230 including an inorganic material. The inorganic light-emitting diode 230 may include a first semiconductor layer 231, a second semiconductor layer 232, an intermediate layer 233 between the first semiconductor layer 231 and the second semiconductor layer 232, a first electrode 235 electrically connected to the first semiconductor layer 231, and a second electrode 238 electrically connected to the second semiconductor layer 232. The first electrode 235 and the second electrode 238 of the inorganic light-emitting diode 230 may be respectively electrically connected to a first electrode pad 241 and a second electrode pad 242, which are located on the same layer.

In some embodiments, the first semiconductor layer 231 may include a p-type semiconductor layer. The p-type semiconductor layer may include a semiconductor material having a composition formula of $InxAl_yGa_{1-x-y}N$ (where $0 \le x \le 1$, $0 \le y \le 1$, and $0 \le x+y \le 1$), for example, a semiconductor material selected from GaN, AlN, AlGaN, InGaN, InN, InAlGaN, or AlInN, and may be doped with a p-type dopant, such as Mg, Zn, Ca, Sr, or Ba.

The second semiconductor layer 232 may include, for example, an n-type semiconductor layer. The n-type semiconductor layer may include a semiconductor material having a composition formula of $InxAl_yGa_{1-x-y}N$ (where $0 \le x \le 1$, $0 \le y \le 1$, and $0 \le x+y \le 1$), for example, a semiconductor material selected from GaN, AlN, AlGaN, InGaN, InN, InAlGaN, or AlInN, and may be doped with an n-type dopant, such as Si, Ge, or Sn.

The intermediate layer 233 may be an area in which electrons and holes recombine, may transition to a low energy level as the electrons and holes recombine, and may generate light having a corresponding wavelength. For example, the intermediate layer 233 may include a semiconductor material having a composition formula of $InxAl_yGa_{1-x-y}N$ (where $0 \le x \le 1$, $0 \le y \le 1$, and $0 \le x+y \le 1$), and may be formed in a single-quantum well structure or a multi-quantum well (MQW) structure. In addition, the intermediate layer 233 may include a quantum wire structure or a quantum dot structure.

FIG. 8B illustrates that the first semiconductor layer 231 includes a p-type semiconductor layer, and that the second semiconductor layer 232 includes an n-type semiconductor layer, but the disclosure is not limited thereto. In one or more other embodiments, the first semiconductor layer 231 may include an n-type semiconductor layer, and the second semiconductor layer 232 may include a p-type semiconductor layer.

Figure 9:
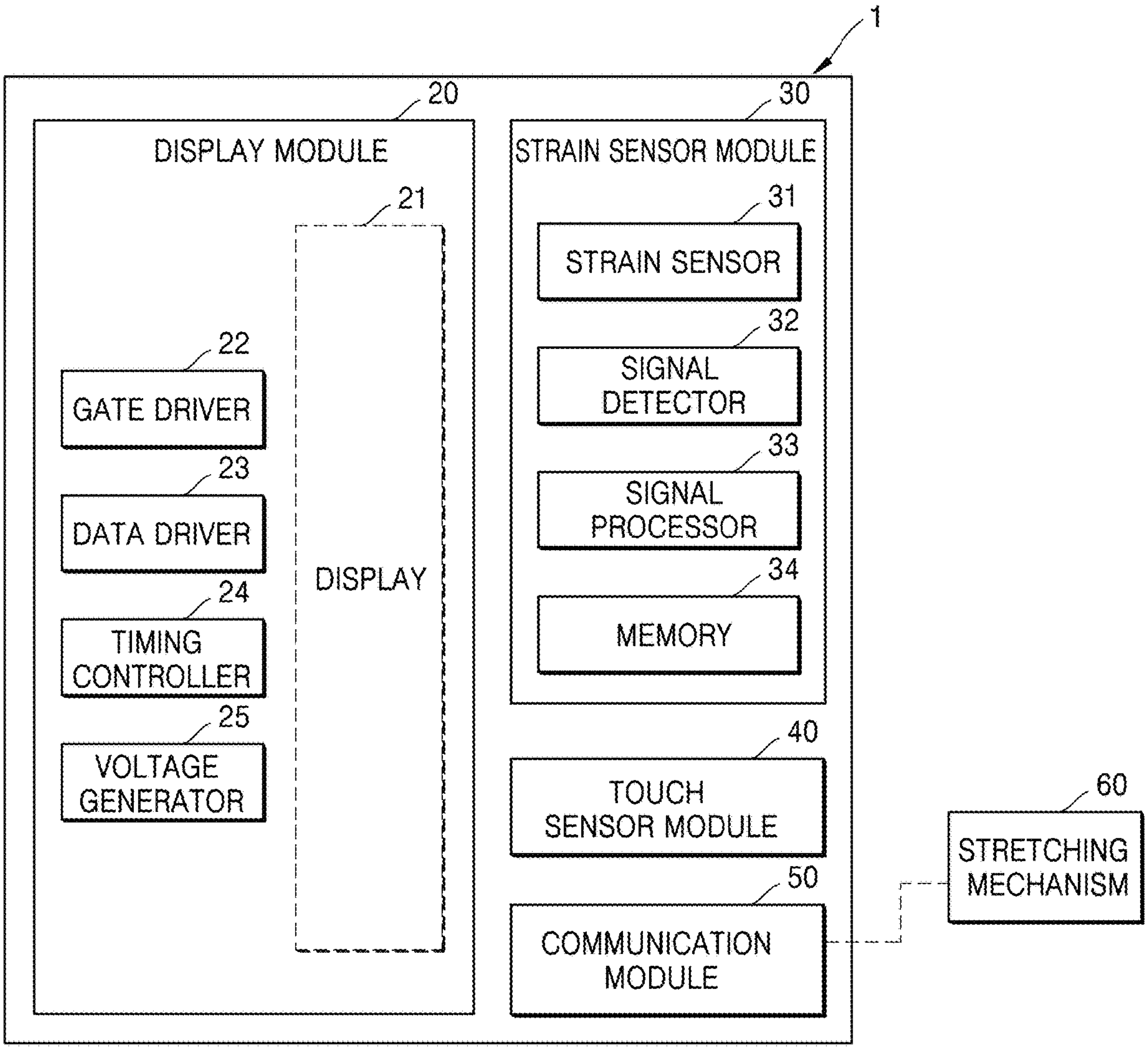
FIG. 9 is a schematic view of a display apparatus according to one or more embodiments.

FIG. 9 is a schematic view of the display apparatus 1 according to one or more embodiments.

Referring to FIG. 9, the display apparatus 1 may be an apparatus for displaying a moving image or a still image. The display apparatus 1 may be used as a display screen of various products, such as a television, a laptop computer, a monitor, a billboard, and an Internet of Things (IOT) device, as well as portable electronic devices, such as a mobile phone, a smartphone, a tablet personal computer (PC), a mobile communication terminal, an electronic notebook, an electronic book, a portable multimedia player (PMP), a navigation device, and an ultra-mobile PC (UMPC). In addition, the display apparatus 1 according to one or more embodiments may be used in electronic devices including wearable devices, such as a smart watch, a watch phone, a glasses-type display, and/or a head-mounted display (HMD). In addition, the display apparatus 1 according to one or more embodiments may be used as a display of various electronic devices, for example, a vehicle instrument panel, a center information display (CID) located on a center fascia or dashboard of a vehicle, a room mirror display replacing a side mirror of a vehicle, or a display located on a rear surface of a front seat as an entertainment device for a back seat of a vehicle.

The display apparatus 1 may include a display module 20, a strain sensor module 30, a touch sensor module 40, and a communication module 50. The display module 20 may provide a corresponding image to the display apparatus 1. For example, the display module 20 may include a display 21 including a plurality of pixels, along with signal lines configured to transmit signals to the pixels, and driving circuits for driving the display 21. The driving circuits for driving the display 21 may include a gate driver 22, a data driver 23, a timing controller 24, and a voltage generator 25.

The gate driver 22 may include the gate-driving circuit GDC (see FIG. 4), and the data driver 23 may include the data-driving circuit DDC (see FIG. 4). In one or more embodiments, the timing controller 24 and the voltage generator 25 may each be mounted on the circuit board 500.

The strain sensor module 30 may detect stretching of the display panel DP and may generate an electrical signal or data corresponding to the detected state. For example, the strain sensor module 30 may detect stretching of the display panel DP to determine an operation section, and may generate a control signal for protecting the display panel DP, according to the determined operation section. The strain sensor module 30 may include a strain sensor 31, and driving circuits for driving the strain sensor 31. The driving circuits for driving the strain sensor 31 may include a signal detector 32, a signal processor 33, and a memory 34.

The touch sensor module 40 may detect the presence or absence of a user's touch input and a touch position, and may generate touch data corresponding thereto. The touch sensor module 40 may include touch electrodes, touch signal lines, and driving circuits for driving the touch electrodes. In one or more embodiments, the strain sensor module 30 and the touch sensor module 40 may be integrated into one component. For example, the touch electrodes may be used as the strain sensor 31. In one or more other embodiments, the strain sensor module 30 and the display module 20 may be integrated into one component. In one or more other embodiments, the strain sensor module 30, the touch sensor module 40, and the display module 20 may be integrated into one component.

The communication module 50 may provide a communication channel between the display apparatus 1 and a stretching mechanism 60 or an external electronic device, and may support communication through the communication channel. The communication module 50 may be a wireless communication module and/or a wired communication module. The communication module 50 may include one or more communication processors supporting wired or wireless communication.

The stretching mechanism 60 may apply an external force to the display panel DP (see FIG. 1) to deform the display panel DP. In one or more embodiments, the stretching mechanism 60 may include a frame to which the display panel DP is fixed, an arm extending the frame, and a power generator for driving the frame. The stretching mechanism 60 may be accommodated in a housing of an electronic device together with the display apparatus 1. In one or more other embodiments, the stretching mechanism 60 may be a separate electronic device that is independent from an electronic device including the display apparatus 1. In one or more other embodiments, the stretching mechanism 60 may be omitted.

The stretching mechanism 60 may be connected to the display apparatus 1 through the communication module 50 to exchange an electrical signal or data with the display apparatus 1. In one or more embodiments, the strain sensor module 30 may transmit a control signal to the stretching mechanism 60 according to an operation section of the display panel DP. For example, if the display panel DP deviates from a normal operation section, the stretching mechanism 60 may stop stretching of the display panel DP, or may shrink the display panel DP, based on the control signal.

Figure 10:
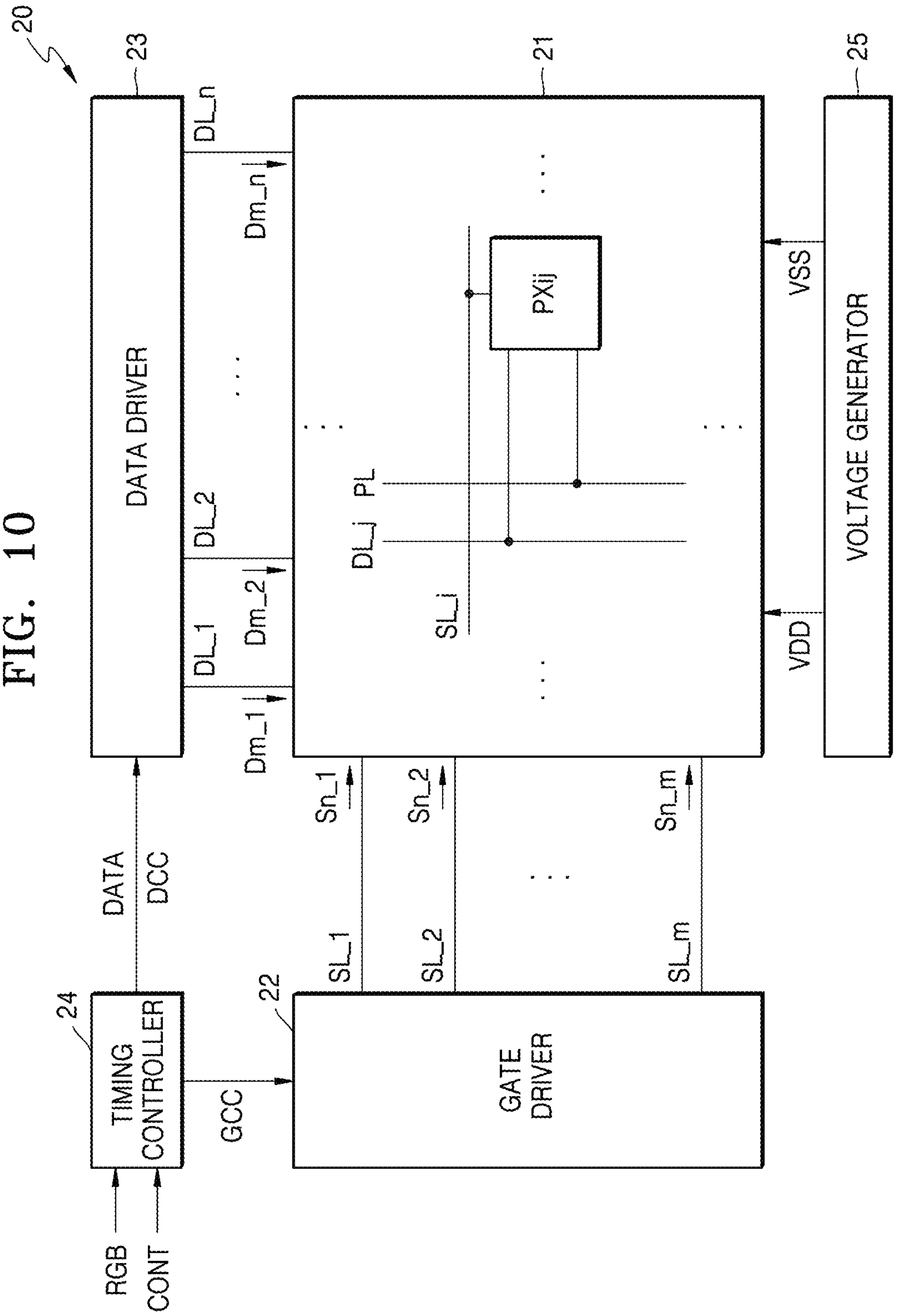
FIG. 10 is a schematic view of a display module according to one or more embodiments.

FIG. 10 is a schematic view of the display module 20 according to one or more embodiments.

Referring to FIG. 10, a display apparatus may include the display module 20. The display module 20 may include the display 21, the gate driver 22, the data driver 23, the timing controller 24, and the voltage generator 25.

The display 21 may include sub-pixels PX, such as a sub-pixel PXij located in an i-th row and a j-th column. For ease of understanding, only one sub-pixel PXij is shown in FIG. 10, but sub-pixels PX in the number of m×n may be arranged, for example, in a matrix form. Here, i may be a natural number between 1 to m, inclusive, and j may be a natural number between 1 to n, inclusive.

For illustrative purposes only, FIG. 10 mainly illustrates a sub-pixel PX employing a pixel-driving circuit including two transistors and one capacitor. However, the disclosure is not only applicable to a sub-pixel PX employing such a pixel-driving circuit, but may also be equally applied to sub-pixels PX employing other pixel-driving circuits, for example, a sub-pixel PX employing a pixel-driving circuit including three transistors and one capacitor, or a sub-pixel PX employing a pixel-driving circuit including seven transistors and one capacitor.

The sub-pixels PX may be connected to scan lines SL_1 to SL_m, data lines DL_1 to DL_n, and a power line PL. For example, the sub-pixel PXij located in the i-th row and the j-th column may be connected to a scan line SL_i, a data line DL_j, and/or the power line PL.

The data lines DL_1 to DL_n may extend in the second direction (the y direction), and may be connected to the sub-pixels PX located in the same column. The scan lines SL_1 to SL_m may extend in the first direction (the x direction), and may be connected to the sub-pixels PX located in the same row.

The power line PL may include a plurality of vertical power lines extending in the second direction (the y direction), and the plurality of vertical power lines may be connected to the sub-pixels PX located in the same column.

The scan lines SL_1 to SL_m may be configured to respectively transmit scan signals Sn_1 to Sn_m output from the gate driver 22 to the sub-pixels PX in the same row. The data lines DL_1 to DL_n may be configured to respectively transmit data signals Dm_1 to Dm_n output from the data driver 23 to the sub-pixels PX in the same column. The sub-pixel PXij located in the i-th row and the j-th column may receive a scan signal Sn_i and a data signal Dm_j.

The power line PL may be configured to transmit the first power voltage VDD output from the voltage generator 25 to the sub-pixels PX. The power line PL may be the same component as the first voltage line VDDL described with reference to FIGS. 7A to 7C.

The sub-pixel PXij may include a light-emitting element and a driving transistor for controlling the size of a current flowing to the light-emitting element, based on the data signal Dm_j. The data signal Dm_j may be output from the data driver 23, and may be received by the sub-pixel PXij through the data line DL_j. The light-emitting element may be, for example, an organic light-emitting diode. As the light-emitting element emits light with a brightness corresponding to the magnitude of a current received from the driving transistor, the sub-pixel PXij may express a gray level corresponding to the data signal Dm_j.

The voltage generator 25 may generate voltages suitable to drive the sub-pixel PXij. For example, the voltage generator 25 may generate the first power voltage VDD and the second power voltage VSS. The first power voltage VDD may have a level that is higher than that of the second power voltage VSS.

The voltage generator 25 may generate an initialization voltage, and may provide the generated initialization voltage to the sub-pixels PX. The initialization voltage may be applied to a gate of a driving transistor and/or an anode of a light-emitting element.

In addition, the voltage generator 25 may generate a turn-on voltage and a turn-off voltage for controlling a switching transistor of the sub-pixel PXij, and may provide the generated turn-on voltage and turn-off voltage to the gate driver 22. The switching transistor may be turned on if the turn-on voltage is applied to a gate of the switching transistor, and the switching transistor may be turned off if the turn-off voltage is applied to the gate of the switching transistor. The voltage generator 25 may generate gamma reference voltages, and may provide the generated gamma reference voltages to the data driver 23.

The timing controller 24 may control the display 21 by controlling operation timings of the gate driver 22 and the data driver 23. The sub-pixels PX of the display 21 may receive a new data signal Dm every frame period, and may emit light with a luminance corresponding to the data signal Dm, thereby displaying an image corresponding to image source data RGB of one frame.

The timing controller 24 may receive the image source data RGB and display module control signal CONT from the outside. The timing controller 24 may convert the image source data RGB into image data DATA based on the characteristics of the display 21 and the sub-pixels PX. The timing controller 24 may provide the image data DATA to the data driver 23.

The display module control signal CONT may include a vertical synchronization signal, a horizontal synchronization signal, a data enable signal, and a clock signal. The timing controller 24 may control the operation timings of the gate driver 22 and the data driver 23 by using the display module control signal CONT. The timing controller 24 may determine a frame period by counting a data enable signal of a horizontal scanning period. The image source data RGB may include luminance information of the sub-pixels PX. Luminance may have a set number of gray levels, for example, 1024 (=$2^{10}$), 256 (=$2^8$), or 64 (=$2^6$) gray levels.

The timing controller 24 may generate control signals including a gate-timing control signal GCC for controlling the operation timing of the gate driver 22, and a data-timing control signal DCC for controlling the operation timing of the data driver 23.

The gate driver 22 may sequentially generate the scan signals Sn_1 to Sn_m by using the turn-on voltage or turn-off voltage provided from the voltage generator 25 in response to the gate-timing control signal GCC supplied from the timing controller 24.

The data driver 23 may sample and latch the image data DATA supplied from the timing controller 24 in response to the data-timing control signal DCC supplied from the timing controller 24, and to convert the image data DATA into data of a parallel data system. When converting the image data DATA into data of a parallel data system, the data driver 23 may convert the image data DATA into a gamma reference voltage to convert the image data DATA into an analog data signal. The data driver 23 may provide the data signals Dm_1 to Dm_n to the sub-pixels PX through the data lines DL_1 to DL_n. The sub-pixels PX may receive the data signals Dm_1 to Dm_n in response to the scan signals Sn_1 to Sn_m.

Figure 11:
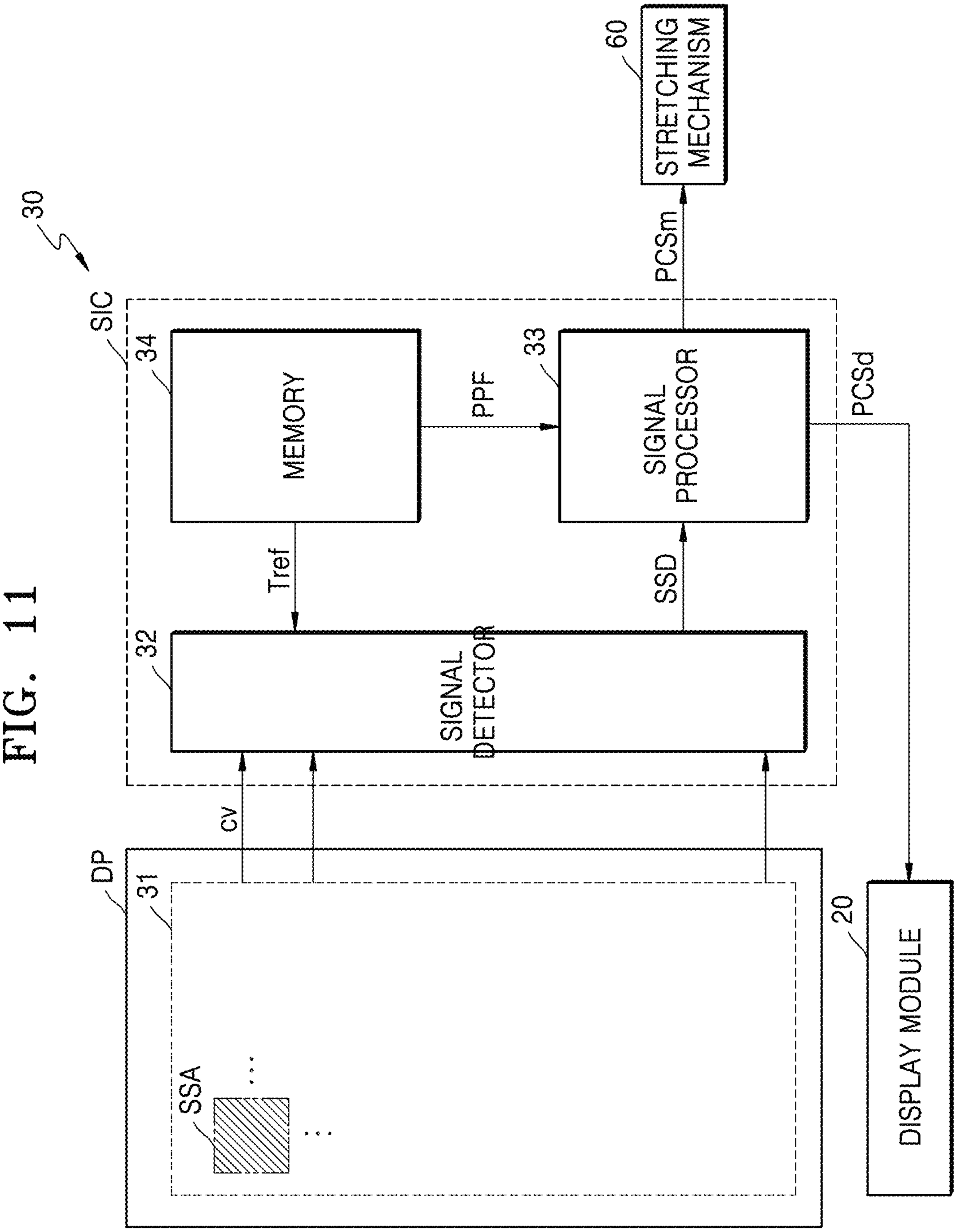
FIG. 11 is a schematic view of a strain sensor module according to one or more embodiments.

FIG. 11 is a schematic view of the strain sensor module 30 according to one or more embodiments.

Referring to FIG. 11, the strain sensor module 30 may include the strain sensor 31, the signal detector 32, the signal processor 33, and the memory 34. The strain sensor 31 may be included in the display panel DP, and the signal detector 32, the signal processor 33, and the memory 34 may be included in the sensor circuit SIC.

The strain sensor 31 may include layers, patterns, or wires of which a first characteristic value cv changes according to stretching of the display panel DP. The first characteristic value cv may be a measurable physical quantity. In one or more embodiments, the strain sensor 31 may include wires crossing the display panel DP, and the first characteristic value cv may be the amount of change in resistance and/or capacitance of the wires.

The signal detector 32 may detect a first characteristic value cv of the strain sensor 31, and may convert the first characteristic value cv into stretch-sensing data SSD, which is a digital signal. For example, the signal detector 32 may detect a first characteristic value cv of the strain sensor 31, and may generate stretch-sensing data SSD including an elongation rate and a stretch position that correspond to the first characteristic value cv by using a reference matrix Tref in the memory 34. In one or more embodiments, the stretch-sensing data SSD may include a stretch time. For example, the signal detector 32 may obtain measurement time point information along with the first characteristic value cv, and the stretch-sensing data SSD may include a stretch time, which is a time interval between measurement time points. The measurement time point information may be obtained using various known methods, such as clock counting.

In one or more embodiments, the display panel DP may include a plurality of sub-areas SSA arranged in the display area DA. At least one sub-pixel may be arranged in the sub-area SSA. The signal detector 32 may detect a first characteristic value cv of the strain sensor 31 for each sub-area SSA. The stretch-sensing data SSD may include an elongation rate, a stretch position, and a stretch time for each sub-area SSA.

The signal processor 33 may calculate a rate of change in the first characteristic value cv from the stretch-sensing data SSD in real time and, if the rate of change in the first characteristic value cv is greater than a threshold value of a current operation section, may determine an operation section of the display panel DP, and may generate a control signal according to the determined operation section of the display panel DP.

A stress-strain profile PPF may be a curve measured through an experiment in which stress on the display panel DP is increased to measure strain thereon, and may be generated in an inspection process for the display panel DP and may be pre-stored in the memory 34.

The stress-strain profile PPF may include a plurality of operation sections and a plurality of threshold values. Each of the threshold values may be a value corresponding to a boundary between operation sections. In one or more embodiments, the plurality of operation sections may include a normal operation section in which stretching of the display panel DP may be repeated, an abnormal operation section in which permanent deformation occurs in at least some components of the display panel DP, and a normal transient section between the normal operation section and the abnormal operation section. In the present specification, determining a corresponding operation section among the plurality of operation sections may mean determining an operation section in which a stress-strain value of the display panel DP is located in the stress-strain profile PPF.

A threshold value of the normal operation section may correspond to a boundary point between the normal operation section and the normal transient section, a threshold value of the normal transient section may correspond to a boundary point between the normal transient section and the abnormal operation section, and a threshold value of the abnormal operation section may correspond to an end point of the abnormal operation section. In one or more embodiments, a section after the boundary point between the normal transient section and the abnormal operation section in the stress-strain profile PPF may be defined as an end operation section. In the end operation section, the display panel DP may be torn, or may completely lose elasticity.

A threshold value of each of the operation sections may refer to a value obtained by converting a stress-strain value of a boundary point corresponding to a threshold value on the stress-strain profile PPF into a rate of change in the first characteristic value cv. Accordingly, that the rate of change in the first characteristic value cv becomes greater than a threshold value of an operation section may mean that an operation section of the display panel DP is changed to a next operation section.

A control signal generated by the signal processor 33 according to an operation section may include a display control signal PCSd for controlling an operation of the display module 20. The display control signal PCSd may be transmitted to driving circuits for controlling the display panel DP, and the driving circuits may display protection operation information on the display panel DP, may reduce light emission of the display panel DP, or may reduce or block a driving voltage supplied to the display panel DP.

For example, the display control signal PCSd may include a first emission control signal for controlling an operation of the voltage generator 25, a second emission control signal for controlling an operation of the gate driver 22, or a display control signal for controlling an operation of the display 21. The voltage generator 25 may turn off a voltage being supplied, or may change a voltage so that the sub-pixels PX do not emit light, in response to the first emission control signal. The gate driver 22 may turn off the output of a scan signal so that transistors included in the sub-pixels PX are turned off, in response to the second emission control signal. The display module 20 may display protection operation activation information in response to the display control signal. The protection operation activation information may provide a user with stretch information of the display panel DP, and with information on an operation for protecting the display panel DP.

The control signal may include a mechanism control signal PCSm for controlling an operation of the stretching mechanism 60. The stretching mechanism 60 may be configured to stop a stretching operation of the display panel DP, or to stop a stretching operation of the display panel DP and to convert the stretching operation into a shrinking operation, based on the mechanism control signal PCSm.

In one or more embodiments, the signal processor 33 may determine an operation section corresponding to each of the sub-areas SSA, and may generate a control signal for each of the sub-areas SSA. For example, the stretch-sensing data SSD may include stretch information for each of the sub-areas SSA. The signal processor 33 may calculate a rate of change in the first characteristic value cv for each of the sub-areas SSA and, if the rate of change in the first characteristic value cv of any one sub-area SSA is greater than a threshold value of a current operation section of the sub-area SSA, may change an operation section of the sub-area SSA and may generate a control signal for the sub-area SSA according to the changed operation section. In other words, operation sections of the sub-areas SSA may be different from each other, and the signal processor 33 may generate and transmit different control signals according to the operation sections of the sub-areas SSA.

The memory 34 may be a non-volatile memory. The memory 34 may store the stress-strain profile PPF of the display panel DP and the reference matrix Tref including the first characteristic values cv for the sub-areas SSA before the display panel DP is deformed. The stress-strain profile PPF and the reference matrix Tref may be generated in an inspection process for the display panel DP, and may be pre-stored in the memory 34.

Figure 12A:
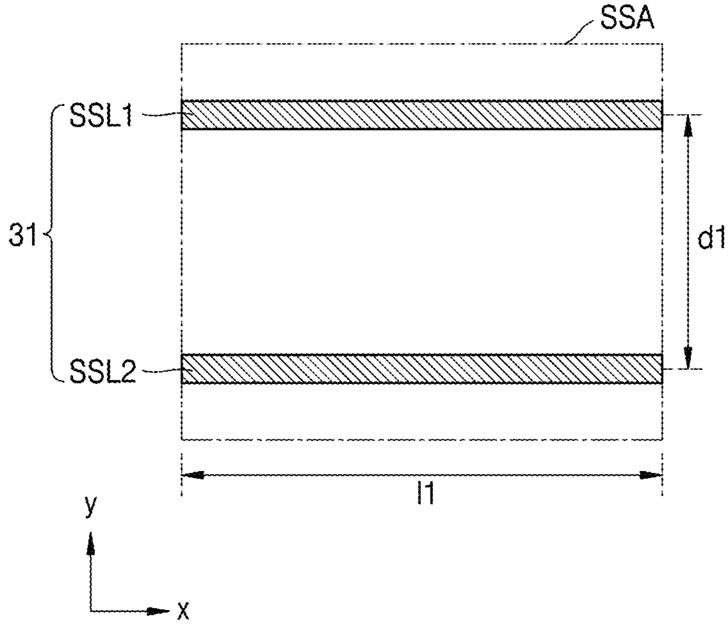
FIGS. 12A and 12B are schematic plan views of a strain sensor according to one or more embodiments.
Figure 12B:
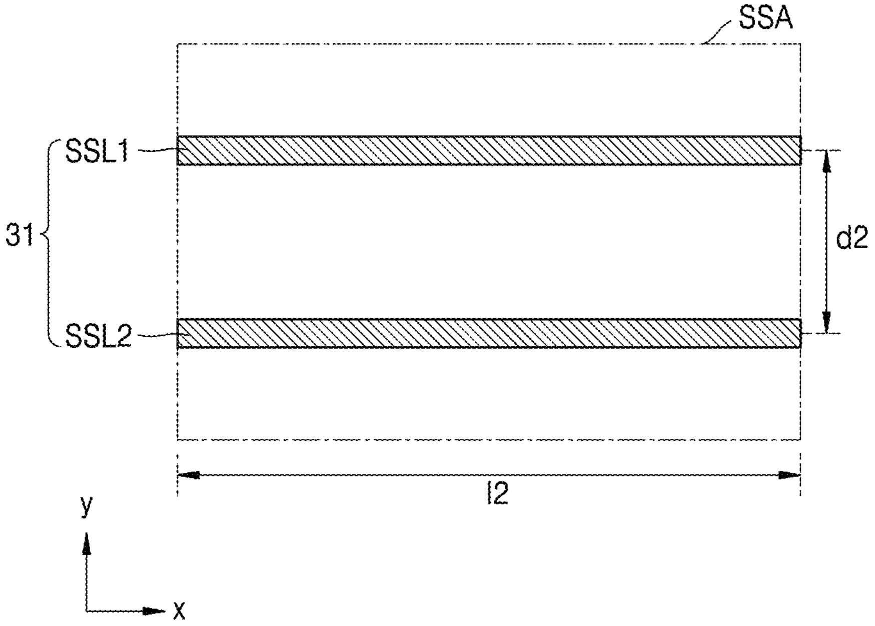

FIGS. 12A and 12B are schematic plan views of the strain sensor 31 of a display apparatus according to one or more embodiments. FIG. 12B shows a state in which the strain sensor 31 shown in FIG. 12A is stretched in the first direction (e.g., the x direction and/or the −x direction).

Referring to FIG. 12A, the strain sensor 31 may include a plurality of sensing lines extending in the first direction (e.g., the x direction and/or the −x direction). In one or more embodiments, a first sensing line SSL1 and a second sensing line SSL2 may be arranged in one sub-area SSA. A portion of each of the first sensing line SSL1 and the second sensing line SSL2, which corresponds to the sub-area SSA, may have a first length l1 in the first direction (e.g., the x direction and/or the −x direction). The first sensing line SSL1 and the second sensing line SSL2 may be spaced apart from each other by a first distance d1 in the second direction (e.g., the y direction and/or the −y direction).

Referring to FIG. 12B, the display panel DP may be stretched in the first direction (e.g., the x direction and/or the −x direction), and the strain sensor 31 may be deformed. For example, a portion of each of the first sensing line SSL1 and the second sensing line SSL2, which corresponds to the sub-area SSA, may have a second length l2 in the first direction (e.g., the x direction and/or the −x direction). The second length l2 may be greater than the first length l1. The first sensing line SSL1 and the second sensing line SSL2 may be spaced apart from each other by a second distance d2 in the second direction (e.g., the y direction and/or the −y direction). The second distance d2 may be less than or about equal to the first distance d1. As the strain sensor 31 is deformed, the resistance and/or capacitance of the sensing lines may change. For example, as the length of each of the first sensing line SSL1 and the second sensing line SSL2 increases, the resistance of each of the first sensing line SSL1 and the second sensing line SSL2 may increase. As the length of each of the first sensing line SSL1 and the second sensing line SSL2 increases, and as a gap between the first sensing line SSL1 and the second sensing line SSL2 decreases, mutual capacitance between the first sensing line SSL1 and the second sensing line SSL2 may increase. The first characteristic value cv of the strain sensor 31, which changes according to stretching of the display panel DP, may be the amount of change in resistance and/or capacitance.

The signal detector 32 may detect a first characteristic value cv of each of the first sensing line SSL1 and the second sensing line SSL2, and may compare the first characteristic value cv with the reference matrix Tref in the memory 34 to generate stretch-sensing data SSD including an elongation rate, a stretch position, and a stretch time in the sub-area SSA.

Figure 13:
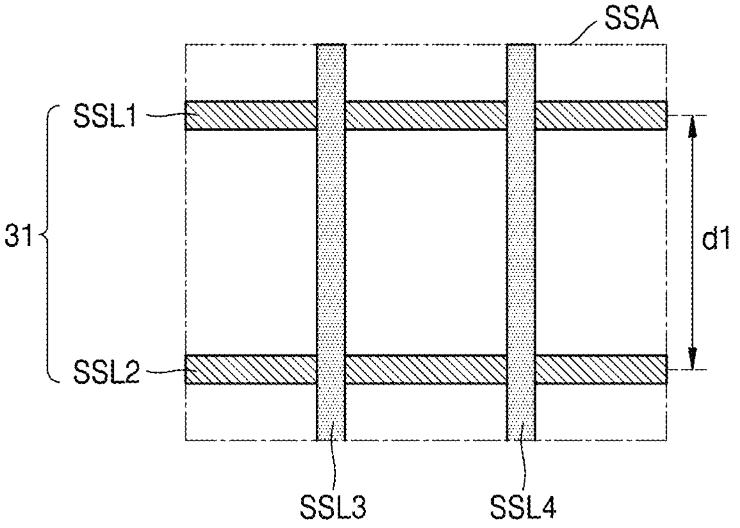
FIG. 13 is a schematic plan view of a strain sensor according to one or more embodiments.

FIG. 13 is a schematic plan view of the strain sensor 31 of a display apparatus according to one or more embodiments.

Referring to FIG. 13, the strain sensor 31 may include horizontal sensing lines extending in the first direction (e.g., the x direction and/or the −x direction), and may include vertical sensing lines extending in the second direction (e.g., the y direction and/or the −y direction) and crossing with the horizontal sensing lines. In one or more embodiments, the first sensing line SSL1 and the second sensing line SSL2, which extend in the first direction (e.g., the x direction and/or the −x direction), and a third sensing line SSL3 and a fourth sensing line SSL4, which extend in the second direction (e.g., the y direction and/or −the y direction), may be arranged in one sub-area SSA. The first sensing line SSL1 and the second sensing line SSL2 may be located on a first conductive layer, and the third sensing line SSL3 and the fourth sensing line SSL4 may be located on a second conductive layer that is different from the first conductive layer.

Mutual capacitance may occur between the horizontal sensing lines and the vertical sensing lines at an crossing region in which the horizontal sensing lines and the vertical sensing lines cross each other. The signal detector 32 may determine a stretch position more accurately by detecting the amount of change in mutual capacitance between the horizontal sensing lines and the vertical sensing lines.

In one or more embodiments, the first sensing line SSL1, the second sensing line SSL2, the third sensing line SSL3, and the fourth sensing line SSL4 may be some of the wires constituting the pixel-driving circuit layer PCL. The first sensing line SSL1 and the second sensing line SSL2 may be signal lines (e.g., scan lines and/or horizontal power lines) extending in the first direction (e.g., the x direction and/or the −x direction), and the third sensing line SSL3 and the fourth sensing line SSL4 may be signal lines (e.g., data lines and/or vertical power lines) extending in the second direction (e.g., the y direction and/or the −y direction).

In one or more other embodiments, the first sensing line SSL1, the second sensing line SSL2, the third sensing line SSL3, and the fourth sensing line SSL4 may be some of the touch electrodes constituting the touch sensor layer 400. The first sensing line SSL1 and the second sensing line SSL2 may be first touch electrodes extending in the first direction (e.g., the x direction and/or the −x direction), and the third sensing line SSL3 and the fourth sensing line SSL4 may be second touch electrodes extending in the second direction (e.g., the y direction and/or the −y direction).

In one or more other embodiments, the first sensing line SSL1, the second sensing line SSL2, the third sensing line SSL3, and the fourth sensing line SSL4 may be components that are different from the signal lines and the touch electrodes.

FIGS. 12A, 12B, and 13 show the first sensing line SSL1, the second sensing line SSL2, the third sensing line SSL3, and the fourth sensing line SSL4 each having a straight line shape, but the disclosure is not limited thereto. In one or more embodiments, the sensing lines may each have a serpentine shape. In one or more embodiments, the sensing lines may each have a mesh shape in which a plurality of openings are formed.

The first sensing line SSL1, the second sensing line SSL2, the third sensing line SSL3, and the fourth sensing line SSL4 may each include at least one metallic conductive material selected from molybdenum (Mo), mendelevium (Md), Ag, titanium (Ti), copper (Cu), or Al. In some embodiments, the first sensing line SSL1, the second sensing line SSL2, the third sensing line SSL3, and the fourth sensing line SSL4 may each include a conductive composite in which metal nanostructures or the like are dispersed in polymer resin. The conductive composite may include an elastomer, and may further include additives, such as carbon nanotubes, carbon fibers, graphene, and graphene oxide, to improve conductivity. In one or more other embodiments, the first sensing line SSL1, the second sensing line SSL2, the third sensing line SSL3, and the fourth sensing line SSL4 may each include a liquid metal material, such as an eutectic gallium-indium alloy. The first sensing line SSL1, the second sensing line SSL2, the third sensing line SSL3, and the fourth sensing line SSL4 may each have a single-layer or multi-layer structure including the above-described conductive material.

However, the strain sensor 31 of the disclosure is not limited to the configurations shown in FIGS. 12A to 13, and may use various known methods for sensing stretching of the display panel DP.

Figure 14A:
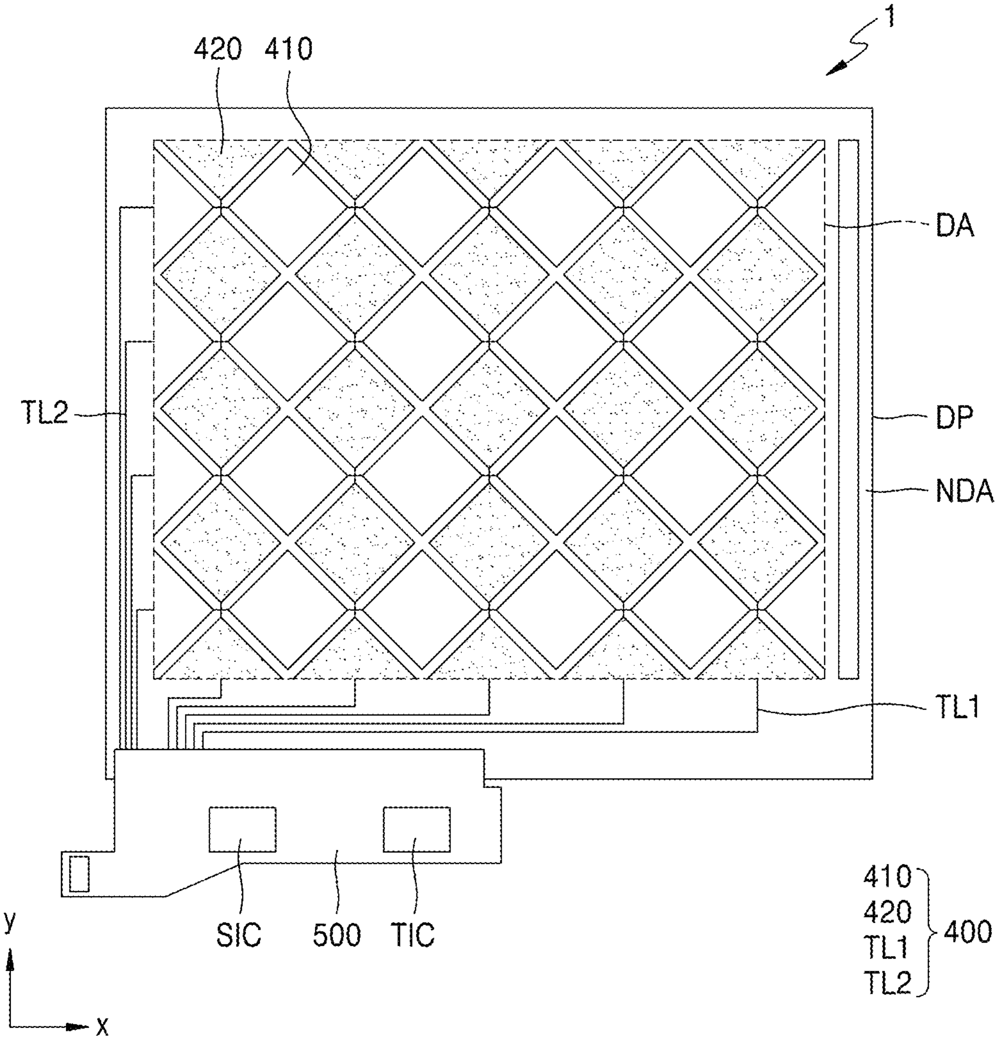
FIG. 14A is a schematic view of a touch sensor module according to one or more embodiments.
Figure 14B:
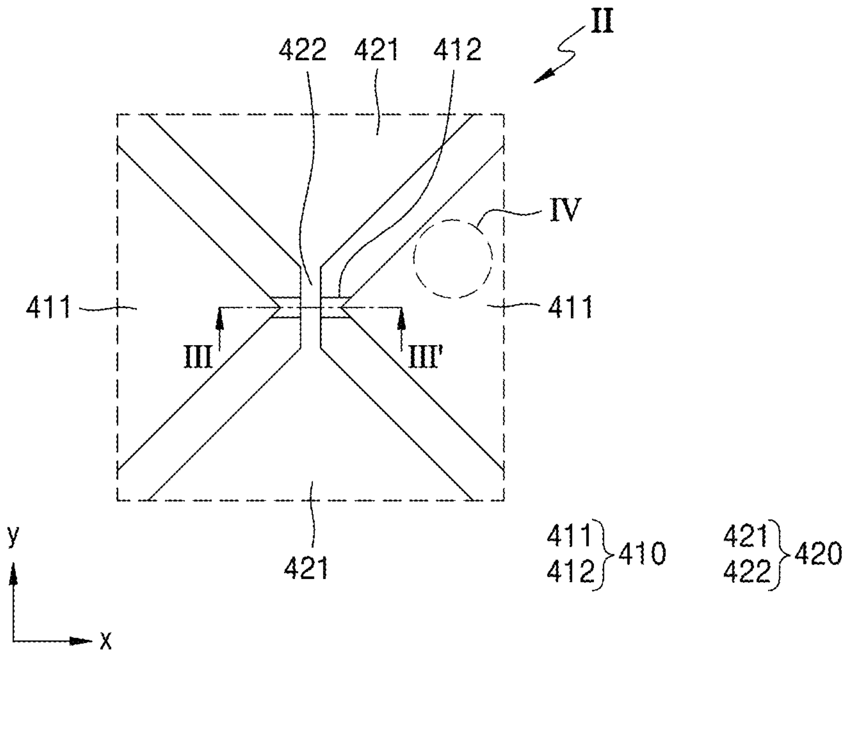
FIG. 14B is a schematic plan view of a portion of a touch sensor shown in FIG. 14A.
Figure 14C:
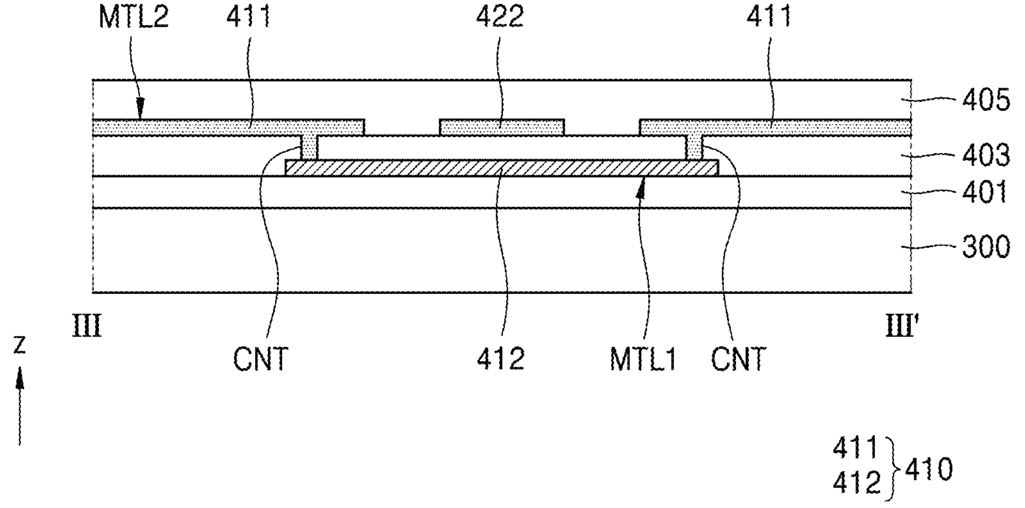
FIG. 14C is a schematic cross-sectional view of a portion of a touch sensor according to one or more embodiments.
Figure 14D:
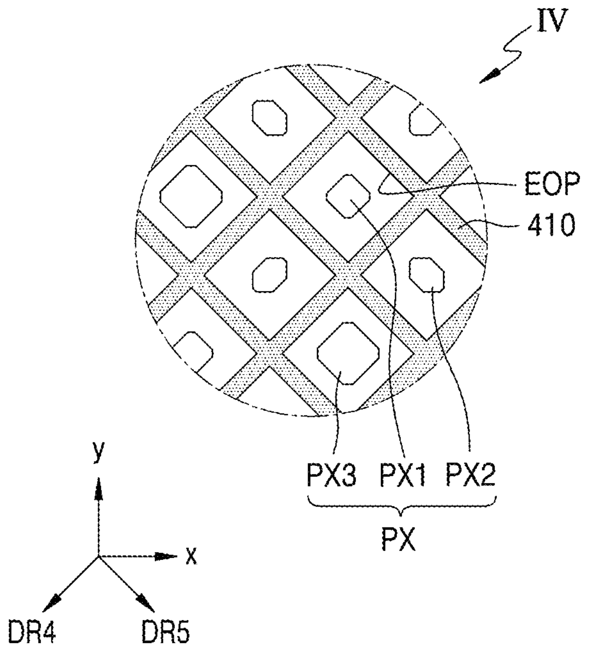
FIG. 14D is a schematic plan view of a portion of a touch sensor according to one or more embodiments.

FIG. 14A is a schematic view of the display apparatus 1 according to one or more embodiments. FIG. 14B is a schematic plan view of a portion of a touch sensor shown in FIG. 14A. FIG. 14C is a schematic cross-sectional view of a portion of a touch sensor according to one or more embodiments. FIG. 14D is a schematic plan view of a portion of a touch sensor according to one or more embodiments.

Referring to FIG. 14A, in one or more embodiments, the display apparatus 1 may include a capacitive touch sensor. The display apparatus 1 may include the touch sensor layer 400 located on the display panel DP, and the touch circuit TIC located on the circuit board 500.

The touch sensor layer 400 may include first touch electrodes 410 extending in the first direction (e.g., the x direction and/or the −x direction), second touch electrodes 420 extending in the second direction (e.g., the y direction and/or the −y direction), and first and second touch signal lines TL1 and TL2.

Referring to FIG. 14B, the first touch electrode 410 may include first electrode portions 411 arranged in the first direction (e.g., the x direction and/or the −x direction), and first connection portions 412 connecting adjacent ones of the first electrode portions 411 to each other. The second touch electrode 420 may include second electrode portions 421 arranged in the second direction (e.g., the y direction and/or the −y direction), and second connection portions 422 connecting adjacent ones of the second electrode portions 421 to each other. The first connection portion 412 and the second connection portion 422 may cross with each other in different directions, and portions thereof may overlap each other in a plan view.

Referring to FIG. 14C, a first insulating layer 401 may be located on the encapsulation layer 300, and a first conductive layer MTL1 may be located on the first insulating layer 401. A second insulating layer 403 may be located on the first conductive layer MTL1, and a second conductive layer MTL2 may be located on the second insulating layer 403. A third insulating layer 405 may be located on the second conductive layer MTL2.

The second conductive layer MTL2 may include the first electrode portion 411, the second electrode portion 421, and the second connection portion 422, and the first conductive layer MTL1 may include the first connection portion 412. The first electrode portions 411 may be connected to the first connection portion 412 through contact holes CNT penetrating the second insulating layer 403 at both ends of the first connection portion 412. The second electrode portions 421 may be connected to the second connection portions 422. In one or more other embodiments, the first conductive layer MTL1 may include the second electrode portion 421 and the second connection portion 422, and the second conductive layer MTL2 may include the first electrode portion 411 and the first connection portion 412.

The first conductive layer MTL1 and the second conductive layer MTL2 may each include at least one metallic conductive material selected from Mo, Md, Ag, Ti, Cu, or Al. In some embodiments, the first conductive layer MTL1 and the second conductive layer MTL2 may each include a conductive composite in which metal nanostructures or the like are dispersed in polymer resin. The conductive composite may include an elastomer, and may further include additives, such as carbon nanotubes, carbon fibers, graphene, and graphene oxide, to improve conductivity. In one or more other embodiments, the first conductive layer MTL1 and the second conductive layer MTL2 may each include a liquid metal material, such as an eutectic gallium-indium alloy. The first conductive layer MTL1 and the second conductive layer MTL2 may each have a single-layer or multi-layer structure including the above-described conductive material.

The first insulating layer 401, the second insulating layer 403, and the third insulating layer 405 may each include an inorganic insulating material, such as silicon oxide, silicon nitride, and/or silicon oxynitride, or may include an organic insulating material.

Referring to FIG. 14D, the first touch electrode 410 may have a mesh shape in which a plurality of electrode holes EOP are formed. The second touch electrode 420, like the first touch electrode 410, may have a mesh shape. For example, the first touch electrode 410 may be formed by first conductive lines extending in a fourth direction DR4, and second conductive lines extending in a fifth direction DR5 crossing the fourth direction DR4. The fourth direction DR4 and the fifth direction DR5 may each cross the first direction (the x direction) and the second direction (the y direction).

In one or more embodiments, one electrode hole EOP may overlap one sub-pixel PX. For example, the sub-pixels PX may include a first sub-pixel PX1 for emitting light of a first color, a second sub-pixel PX2 for emitting light of a second color, and a third sub-pixel PX3 for emitting light of a third color. The first sub-pixel PX1, the second sub-pixel PX2, or the third sub-pixel PX3 may be arranged inside each electrode hole EOP in a plan view.

The first touch electrodes 410 may be connected to the second touch signal lines TL2, and the second touch electrodes 420 may be connected to the first touch signal lines TL1. The touch circuit TIC may transmit a driving signal to the first touch electrode 410 through the second touch signal line TL2, and may detect a detection signal corresponding to the driving signal from the second touch electrode 420 through the first touch signal line TL1, thereby obtaining touch data including the presence or absence of a user's touch and a touch position.

Mutual capacitance formed between the first touch electrode 410 and the second touch electrode 420 may change due to a user's touch, and due to stretching of the display panel DP. In one or more embodiments, the touch sensor may function as the strain sensor 31. For example, the touch circuit TIC may detect the amount of change in mutual capacitance between the first touch electrode 410 and the second touch electrode 420, and may transmit the detected amount of change to the sensor circuit SIC. A range of change in mutual capacitance due to a user's touch input may be different from a range of change in mutual capacitance due to stretching of the display panel DP. Accordingly, the amount of change in mutual capacitance within the range of change in mutual capacitance due to stretching of the display panel DP may be used as the first characteristic value cv, and the sensor circuit SIC may detect stretching of the display panel DP based on the amount of change in mutual capacitance.

In one or more other embodiments, the touch sensor layer 400 may further include the sensing lines of the strain sensor 31. For example, the first conductive layer MTL1 may include the first connection portion 412 and the sensing lines. The sensing lines may be spaced apart from the first connection portion 412, and may be arranged between the first insulating layer 401 and the second insulating layer 403. In one or more other embodiments, the sensing lines of the strain sensor 31 may be arranged between the encapsulation layer 300 and the first insulating layer 401.

Figure 15:
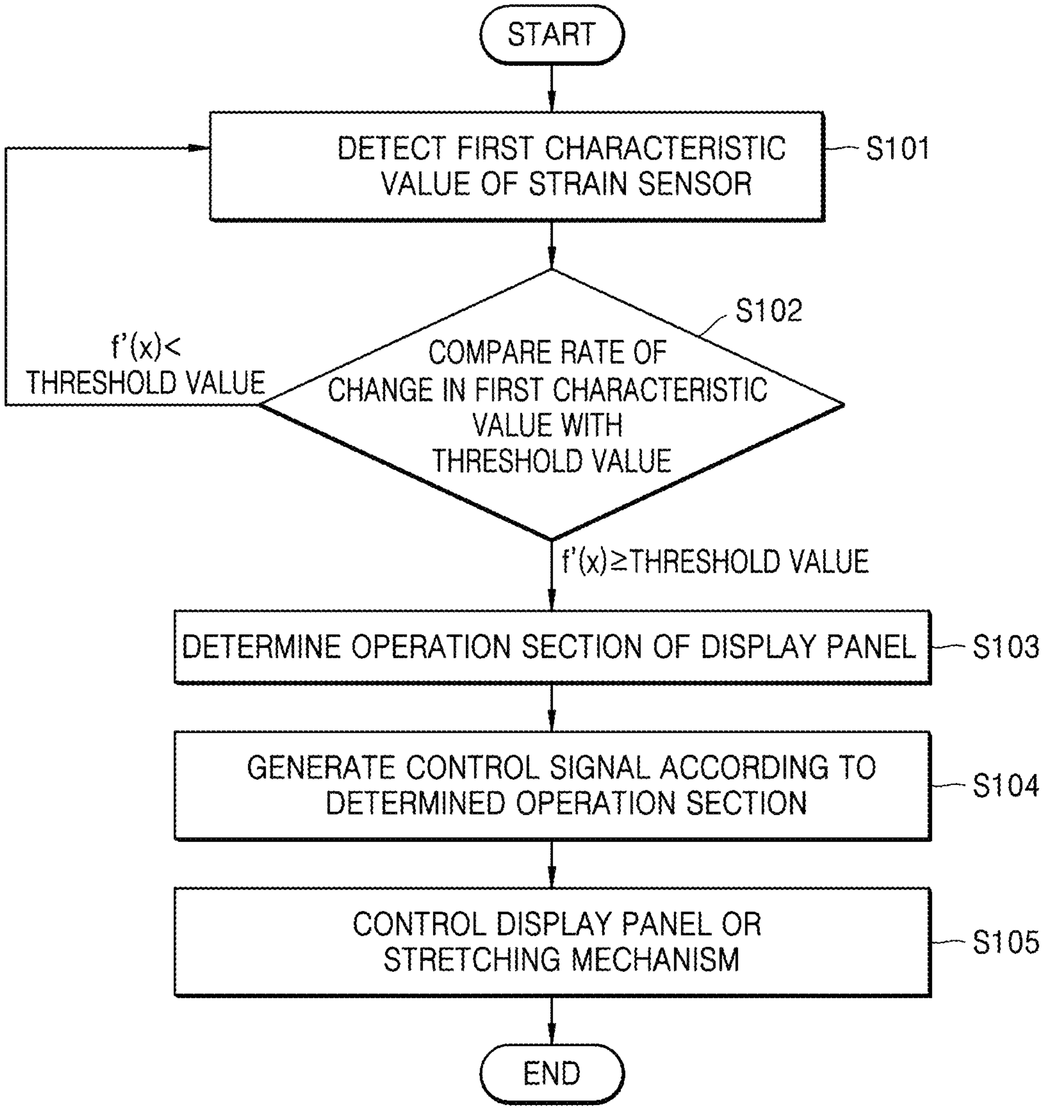
FIG. 15 is a schematic flowchart of an operating method of a display apparatus according to one or more embodiments.
Figure 16:
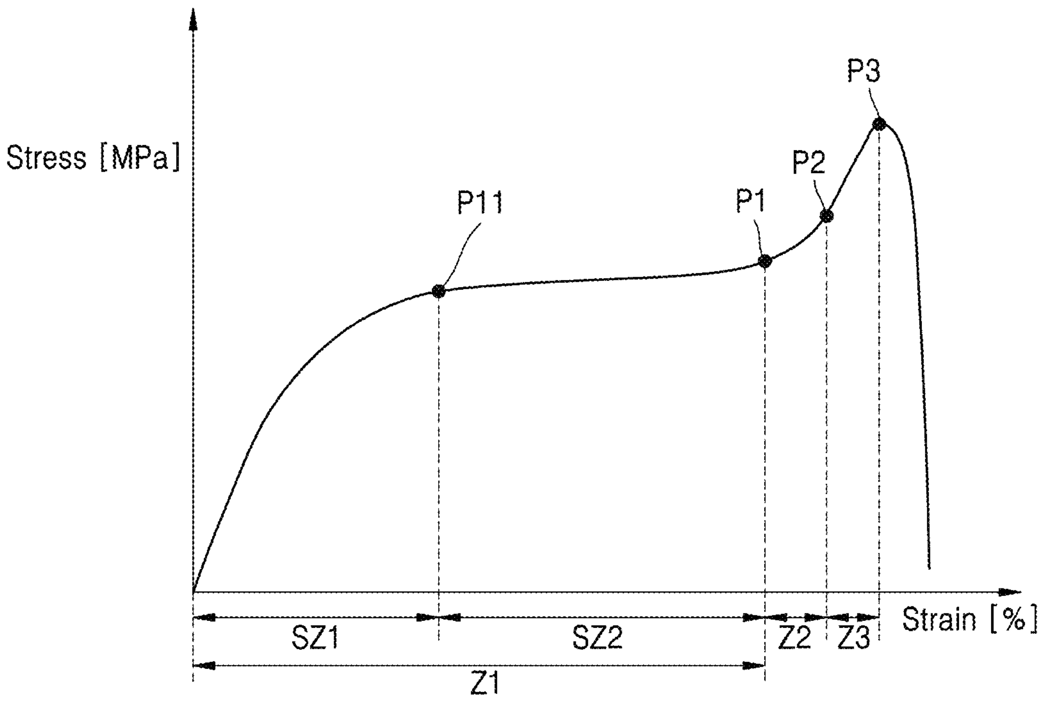
FIG. 16 is a graph showing a strain-stress profile of a display panel according to one or more embodiments.

FIG. 15 is a schematic flowchart of an operating method of the display apparatus 1 according to one or more embodiments. FIG. 16 is a graph showing a strain-stress profile of a display panel according to one or more embodiments.

Referring to FIGS. 15 and 16, the signal detector 32 of the display apparatus 1 may detect a first characteristic value cv of the strain sensor 31 (S101). The first characteristic value cv may be a measurable physical quantity that changes according to stretching of the display panel DP. In one or more embodiments, if the strain sensor 31 includes sensing lines, the first characteristic value cv may be the amount of change in resistance and/or capacitance of the sensing lines. The signal detector 32 may generate stretch-sensing data SSD including the first characteristic value cv, and an elongation rate, a stretch position, and a stretch time that correspond to the first characteristic value cv by using the reference matrix Tref in the memory 34, and may transmit the generated stretch-sensing data SSD to the signal processor 33.

The signal processor 33 may calculate a rate of change f'(x) in the first characteristic value cv based on the stretch-sensing data SSD, and may compare the rate of change f'(x) in the first characteristic value cv with a threshold value of a current operation section (S102). Threshold values may be values corresponding to a boundary point between operation sections or an end point in the stress-strain profile PPF divided into a plurality of operation sections.

FIG. 16 is an example graph showing the stress-strain profile PPF, although the disclosure is not limited thereto. The stress-strain profile PPF may vary depending on the structure of the display panel DP. As shown in FIG. 16, the stress-strain profile PPF may be divided into a plurality of operation sections. The plurality of operation sections may include a normal operation section Z1, a normal transient section Z2, and an abnormal operation section Z3. The normal operation section Z1 may be a section in which stretching of the display panel DP may be repeated without substantial damage to the display panel DP. The abnormal operation section Z3 may be a section in which at least some components of the display panel DP lose elasticity and are permanently deformed. For example, cracks may occur in the inorganic layers constituting the display panel DP in the abnormal operation section Z3, and if the abnormal operation section Z3 is exceeded, a portion of the display panel DP may be torn. If the display panel DP continues to operate in the abnormal operation section Z3, heat generation, burn-in, or the like may occur due to a short circuit in a wire. The normal transient section Z2 may be a section between the normal operation section Z1 and the abnormal operation section Z3.

In one or more embodiments, the normal operation section Z1 may include a plurality of sub-operation sections. The plurality of sub-operation sections may be divided by a stress-strain slope in the stress-strain profile PPF. For example, the normal operation section Z1 may include a first sub-operation section SZ1 in which stress increases proportionally if strain increases, and a second sub-operation section SZ2 in which stress increases relatively gently if strain increases.

A threshold value of the normal operation section Z1 may be the rate of change f'(x) in the first characteristic value cv, which corresponds to a first boundary point P1 between the normal operation section Z1 and the normal transient section Z2. A threshold value of the normal transient section Z2 may be the rate of change f'(x) in the first characteristic value cv, which corresponds a second boundary point P2 between the normal transient section Z2 and the abnormal operation section Z3. A threshold value of the abnormal operation section Z3 may be the rate of change f'(x) in the first characteristic value cv, which corresponds an end point P3 of the abnormal operation section Z3. A threshold value of the first sub-operation section SZ1 may be the rate of change f'(x) in the first characteristic value cv, which corresponds a first-1 boundary point P11 between the first sub-operation section SZ1 and the second sub-operation section SZ2. A threshold value of the second sub-operation section SZ2 may be the rate of change f'(x) in the first characteristic value cv, which corresponds the first boundary point P1 between the second sub-operation section SZ2 and the normal transient section Z2.

An operation section of the display panel DP in an initial state before being stretched may be determined as the first sub-operation section SZ1. If the rate of change f'(x) in the first characteristic value cv is greater than or equal to the threshold value of the current operation section, an operation section may be newly determined (S103). For example, if the display panel DP of which the current operation section is the first sub-operation section SZ1 continues to be stretched, the rate of change f'(x) in the first characteristic value cv may be greater than the threshold value of the first sub-operation section SZ1, which corresponds to the first-1 boundary point P11. In this case, the operation section of the display panel DP may be determined as the second sub-operation section SZ2. If the rate of change f'(x) in the first characteristic value cv is less than the threshold value of the first sub-operation section SZ1, the operation section of the display panel DP may be maintained as the first sub-operation section SZ1, and operation S101 may be repeated so that the strain sensor 31 detects the first characteristic value cv again.

The signal processor 33 may generate a control signal according to the determined operation section (S104). The control signal of the signal processor 33 may be configured differently according to the determined operation section. For example, if the display panel DP of which the current operation section is the second sub-operation section SZ2 continues to be stretched so that the rate of change f'(x) in the first characteristic value cv becomes greater than the threshold value of the normal operation section Z1, which corresponds to the first boundary point P1, the operation section of the display panel DP may be determined as the normal transient section Z2. In the normal transient section Z2, the signal processor 33 may generate a mechanism control signal PCSm for stopping a stretching operation of the stretching mechanism 60, and a display control signal PCSd for displaying protection operation activation information. In this case, the protection operation activation information may be a message for informing a user to cease the stretching operation of the stretching mechanism 60.

If the display panel DP in the normal transient section Z2 continues to be stretched so that the rate of change f'(x) in the first characteristic value cv becomes greater than the threshold value of the normal transient section Z2, which corresponds to the second boundary point P2, the signal processor 33 may generate a mechanism control signal PCSm for stopping a stretching operation of the stretching mechanism 60, and for converting the stretching operation into a shrinking operation, and may generate a display control signal PCSd for turning off a voltage supply of the voltage generator 25. Such one or more embodiments is only an example illustrating that a control signal is configured differently according to an operation section, and the disclosure is not limited thereto. The control signal may be configured in various ways according to the operation section.

In one or more embodiments, if the display panel DP continues to be stretched so that the operation section thereof changes from the first sub-operation section SZ1 to the second sub-operation section SZ2, the signal processor 33 may generate a display control signal PCSd for displaying protection operation activation information on the display panel DP. In this case, the protection operation activation information may be a message for informing a user of stretching state information of the display panel DP.

In one or more embodiments, the display panel DP may include a plurality of sub-areas SSA, and the strain sensor 31 and the signal detector 32 may detect a first characteristic value cv for each of the sub-areas SSA. The signal processor 33 may compare a rate of change f'(x) in the first characteristic value cv of each of the sub-areas SSA with a threshold value in the memory 34, and may determine an operation section for each of the sub-areas SSA. For example, an operation section of any one of the sub-areas SSA may be determined as the normal operation section Z1, and an operation section of another one of the sub-areas SSA may be determined as the normal transient section Z2. Afterwards, the signal processor 33 may control each of the sub-areas SSA according to the operation sections thereof. For example, the signal processor 33 may generate a display control signal PCSd configured to maintain light emission of the sub-area SSA in the normal operation section Z1 and to turn off light emission of the sub-area SSA in the normal transient section Z2.

The display module 20 may control the display panel DP or the stretching mechanism 60 according to the control signal (S105). Afterwards, the operating method may be terminated, or each operation may be repeated.

Figure 17:
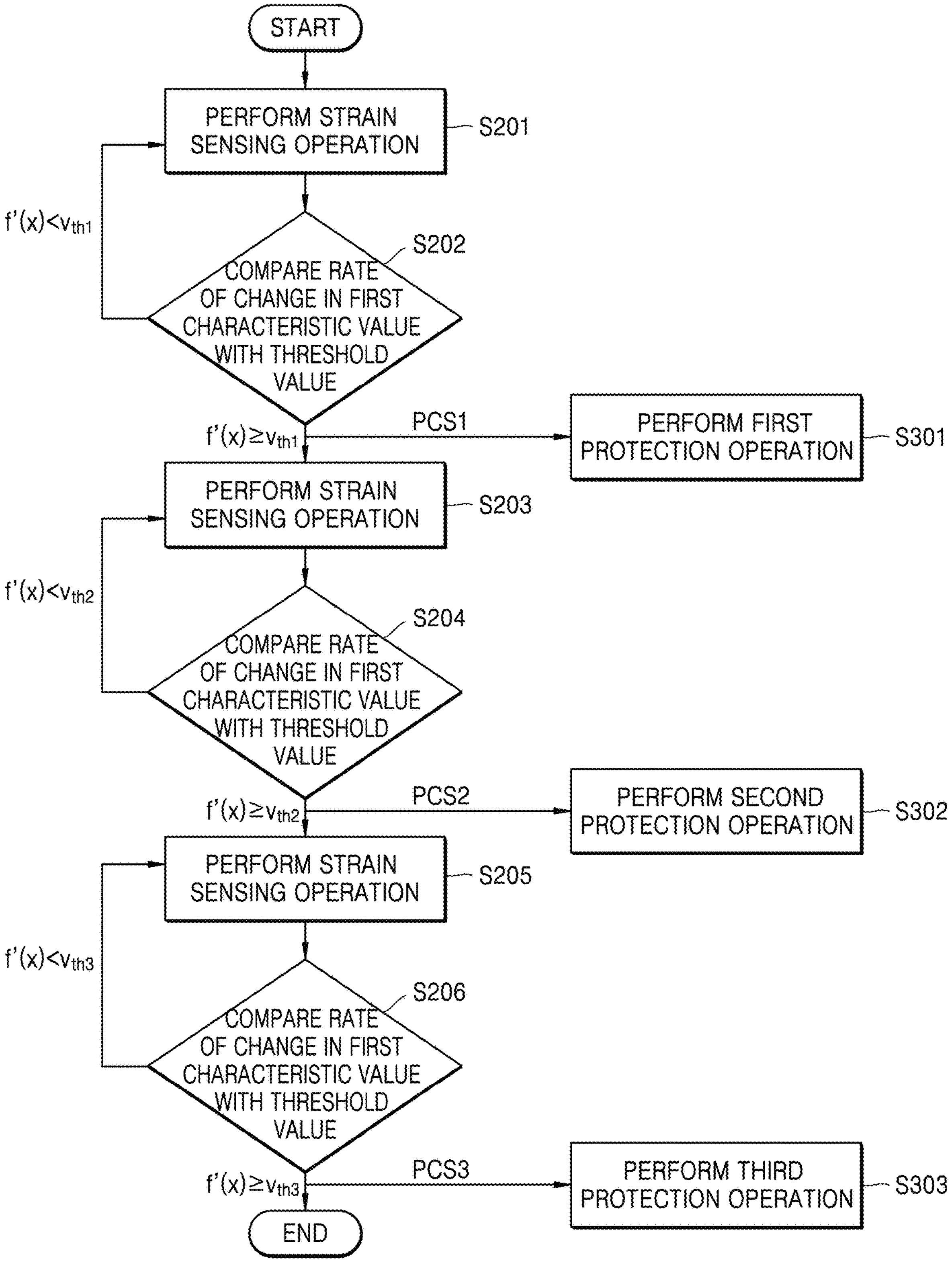
FIG. 17 is a schematic flowchart of an operating method of a display apparatus according to one or more embodiments.

FIG. 17 is a schematic flowchart of an operating method of the display apparatus 1 according to one or more embodiments. FIG. 17 schematically illustrates a case in which the display panel DP continues to be stretched even after performing a protection operation according to each operation.

Referring to FIG. 17, the strain sensor module 30 of the display apparatus 1 may perform a strain-sensing operation of the display panel DP (S201). In an initial stage before the display panel DP is stretched, an operation section of the display panel DP may be the normal operation section Z1. The strain-sensing operation may include operations, which may be performed by the signal detector 32, of detecting a first characteristic value cv of the strain sensor 31 and of generating stretch-sensing data SSD including the first characteristic value cv, along with an elongation rate, a stretch position, and a stretch time that correspond to the first characteristic value cv, and also may include an operation, which may be performed by the signal processor 33, of calculating a rate of change f'(x) in the first characteristic value cv based on the generated stretch-sensing data SSD.

The signal processor 33 may compare the rate of change f'(x) in the first characteristic value cv with a threshold value $v_{th1}$ of the normal operation section Z1 (S202). If the rate of change f'(x) in the first characteristic value cv is less than the threshold value $v_{th1}$ of the normal operation section Z1, the operation section of the display panel DP may be maintained as the normal operation section Z1, and the strain-sensing operation (S201) may be repeated. If the rate of change f'(x) in the first characteristic value cv is greater than or equal to the threshold value $v_{th1}$ of the normal operation section Z1, the operation section of the display panel DP may be determined as the normal transient section Z2, and the signal processor 33 may generate a first control signal PCS1 according to the normal transient section Z2. The display module 20 and/or the stretching mechanism 60 may perform a first protection operation corresponding to the first control signal PCS1 (S301).

After generating the first control signal PCS1 according to the normal transient section Z2, the strain sensor module 30 may perform a strain-sensing operation of the display panel DP (S203), and may compare the rate of change f'(x) in the first characteristic value cv with a threshold value $v_{th2}$ of the normal transient section Z2 (S204). If the rate of change f'(x) in the first characteristic value cv is less than the threshold value $v_{th2}$ of the normal transient section Z2, the operation section of the display panel DP may be maintained as the normal transient section Z2, and the strain-sensing operation (S203) may be repeated. If the rate of change f'(x) in the first characteristic value cv is greater than or equal to the threshold value $v_{th2}$ of the normal transient section Z2, the operation section of the display panel DP may be determined as the abnormal operation section Z3, and the signal processor 33 may generate a second control signal PCS2 according to the abnormal operation section Z3. The display module 20 and/or the stretching mechanism 60 may perform a second protection operation corresponding to the second control signal PCS2 (S302).

After generating the second control signal PCS2 according to the abnormal operation section Z3, the strain sensor module 30 may perform a strain-sensing operation of the display panel DP (S205), and may compare the rate of change f'(x) in the first characteristic value cv with a threshold value $v_{th3}$ of the abnormal operation section Z3 (S206). If the rate of change f'(x) in the first characteristic value cv is less than the threshold value $v_{th3}$ of the abnormal operation section Z3, the operation section of the display panel DP may be maintained as the abnormal operation section Z3, and the strain-sensing operation (S205) may be repeated. If the rate of change f'(x) in the first characteristic value cv is greater than or equal to the threshold value $v_{th3}$ of the abnormal operation section Z3, the operation section of the display panel DP may be determined as an end operation section, and the signal processor 33 may generate a third control signal PCS3 according to the end operation section. The display module 20 and/or the stretching mechanism 60 may perform a third protection operation corresponding to the third control signal PCS3 (S303).

Figure 18:
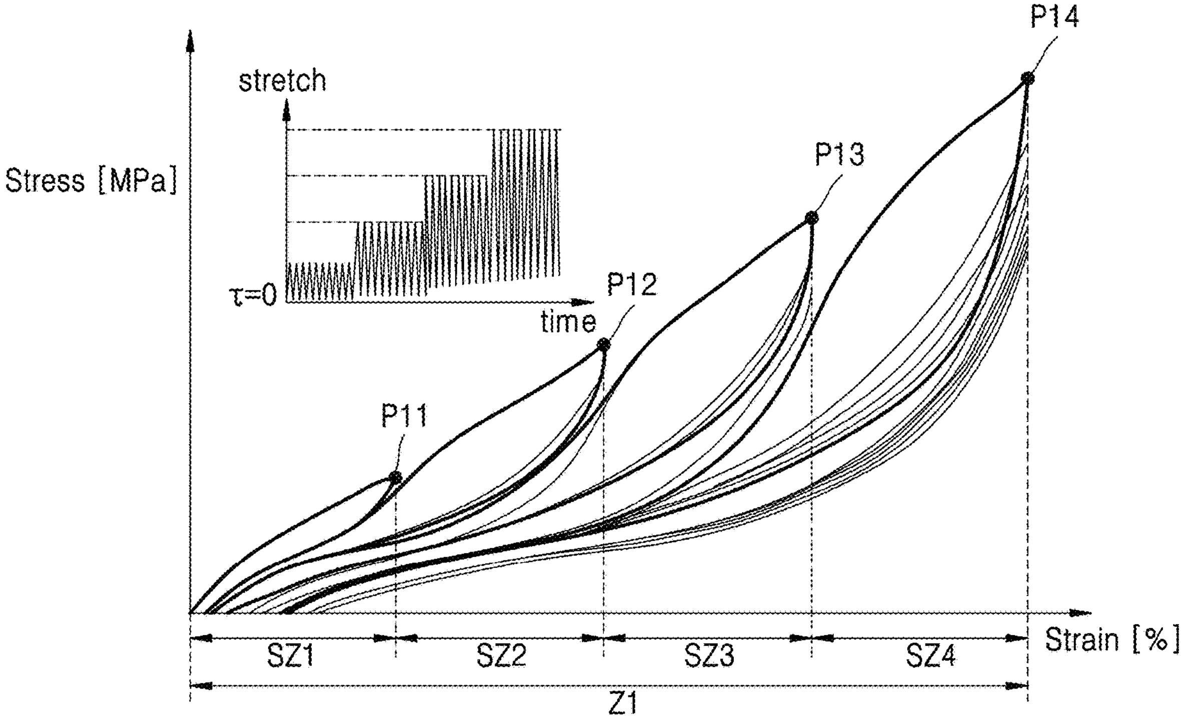
FIG. 18 is a graph showing a sub-operation section according to one or more embodiments.

FIG. 18 is a graph showing a sub-operation section according to one or more embodiments.

Referring to FIG. 18, the normal operation section Z1 may include a plurality of sub-operation sections. In one or more embodiments, the display panel DP may include an elastic layer (e.g., the substrate 100) including an elastic material. According to the Mullins effect characteristics of the elastic layer, a stress-strain curve of the display panel DP may vary due to past stretching history. Accordingly, the plurality of sub-operation sections may be set in consideration of the Mullins effect according to a section in which the display panel DP is repeatedly stretched.

In one or more embodiments, the normal operation section Z1 may include the first sub-operation section SZ1 corresponding to a first stretch repetition section, the second sub-operation section SZ2 corresponding to a second stretch repetition section, a third sub-operation section SZ3 corresponding to a third stretch repetition section, and a fourth sub-operation section SZ4 corresponding to a fourth stretch repetition section.

The memory 34 may store a threshold value of the first sub-operation section SZ1, which corresponds to the first-1 boundary point P11 between the first sub-operation section SZ1 and the second sub-operation section SZ2, a threshold value of the second sub-operation section SZ2, which corresponds to a first-2 boundary point P12 between the second sub-operation section SZ2 and the third sub-operation section SZ3, a threshold value of the third sub-operation section SZ3, which corresponds to a first-3 boundary point P13 between the third sub-operation section SZ3 and the fourth sub-operation section SZ4, and a threshold value of the fourth sub-operation section SZ4, which corresponds to a first-4 boundary point P14 between the fourth sub-operation section SZ4 and the normal transient section Z2.

In one or more embodiments, if the display panel DP continues to be stretched so that the operation section thereof changes from one sub-operation section to a next sub-operation section, the strain sensor module 30 may generate a display control signal PCSd, and the display module 20 may display protection operation activation information on the display panel DP according to the display control signal PCSd. In this case, the protection operation activation information may be a message for informing a user of stretching state information of the display panel DP.

Figure 19:
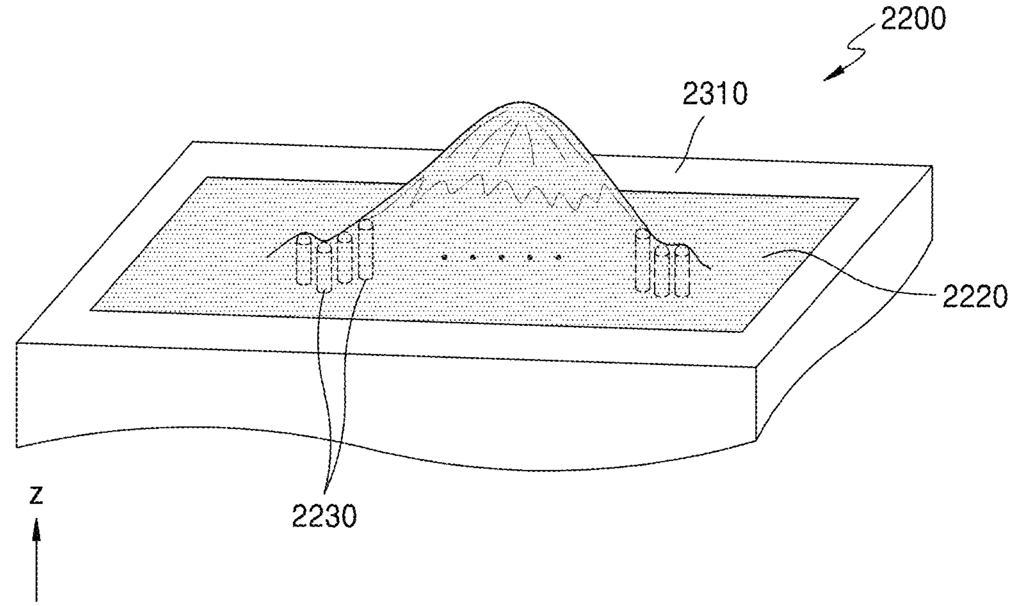
FIG. 19 is a schematic perspective view of an electronic device according to one or more embodiments.
Figure 20:
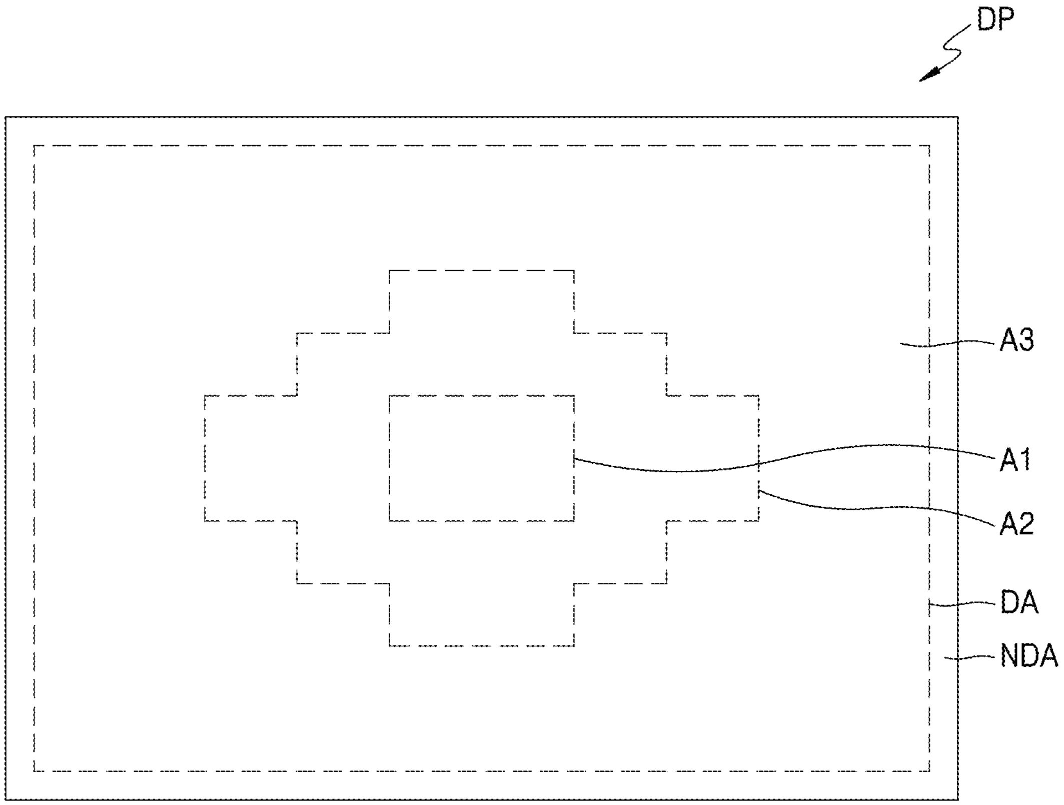
FIG. 20 is a schematic plan view of a display panel of the electronic device shown in FIG. 19.

FIG. 19 is a schematic perspective view of an electronic device 2200 according to one or more embodiments, and FIG. 20 is a schematic plan view of the display panel DP of the electronic device 2200 shown in FIG. 19.

Referring to FIGS. 19 and 20, the electronic device 2200 according to one or more embodiments may include a display 2220 provided inside a frame 2310. The display 2220 may use a display apparatus according to embodiments. The display 2220 may provide an image of a sea with waves, a mountain covered in snow, or a volcano with flowing lava, for example, and in this case, the display 2220 may be stretched in a height direction (e.g., a z direction) to reflect the height of the waves, the mountain, or the volcano. In some embodiments, the height of a portion of the display 2220 may sequentially vary in a direction in which the lava flows, thereby displaying movement of the lava in three dimensions. The electronic device 2200 may include a plurality of pins (or stroke portions) 2230 located on a rear surface of the display 2220, so that the display 2220 can be stretched in the height direction. As the pins 2230 move in the third direction (e.g., the z direction or the −direction), an image expressed on the display 2220 may be implemented to have a three-dimensional height.

If the display 2220 is stretched non-uniformly due to the pins 2230, the display panel DP may be divided into a plurality of areas having different elongation rates. For example, as shown in FIG. 20, the display panel DP may include a first area A1 adjacent to the pin 2230 protruding most in the +z direction, a third area A3 that is flat, and a second area A2 between the first area A1 and the third area A3.

Operation sections of the sub-areas SSA corresponding to the first area A1, operation sections of the sub-areas SSA corresponding to the second area A2, and operation sections of the sub-areas SSA corresponding to the third area A3 may be different from each other. The electronic device 2200 may perform a stretch protection operation according to an operation section of each of the first area A1, the second area A2, and the third area A3.

To describe an operation of an electronic device if the display panel DP is divided into multiple areas having different operating sections, FIGS. 19 and 20 illustrate the electronic device 2200 of which the shape is variable by the pin 2230, but such illustration is only an example. In one or more embodiments, the frame 2310 of the electronic device 2200 may have an uneven surface, and the display panel DP may be attached to the uneven surface of the frame 2310. In this case, a portion of the display panel DP attached to a protruding portion of the frame 2310 and a portion of the display panel DP attached to a concave portion of the frame 2310 may have different corresponding operation sections, and the electronic device 2200 may perform a stretch protection operation according to the operation section of each portion.

FIGS. 21A to 21E are schematic perspective views of embodiments of electronic devices including a display panel according to one or more embodiments.

Figure 21A:
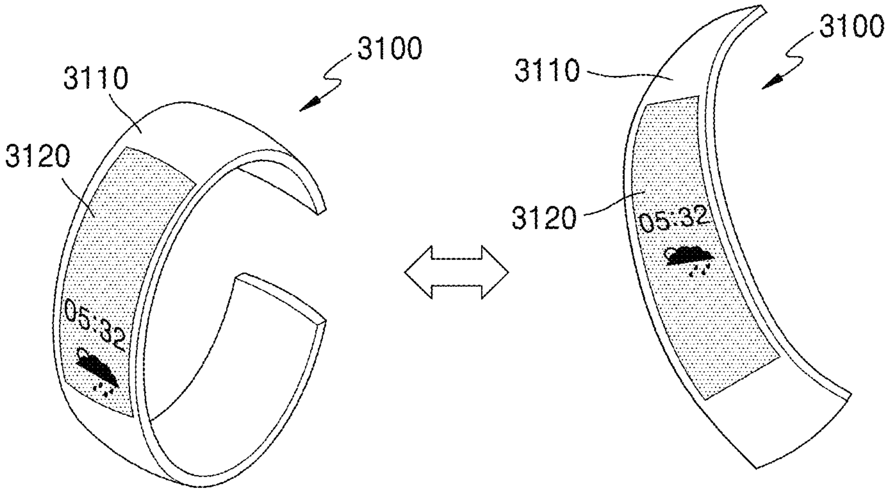
FIGS. 21A to 21E are schematic perspective views of embodiments of electronic devices including a display panel according to one or more embodiments.

Referring to FIG. 21A, a display apparatus according to one or more embodiments may be used in a wearable electronic device 3100 that may be worn on a part of a user's body. The wearable electronic device 3100 may include a body portion 3110, and a display 3120 provided on the body portion 3110. The display apparatus according to one or more embodiments may be used as the display 3120 of the wearable electronic device 3100. As shown in FIG. 21A, the wearable electronic device 3100 may be deformable. In one or more embodiments, the wearable electronic device 3100 may be used as a smart watch or a smartphone according to the user's choice.

Figure 21B:
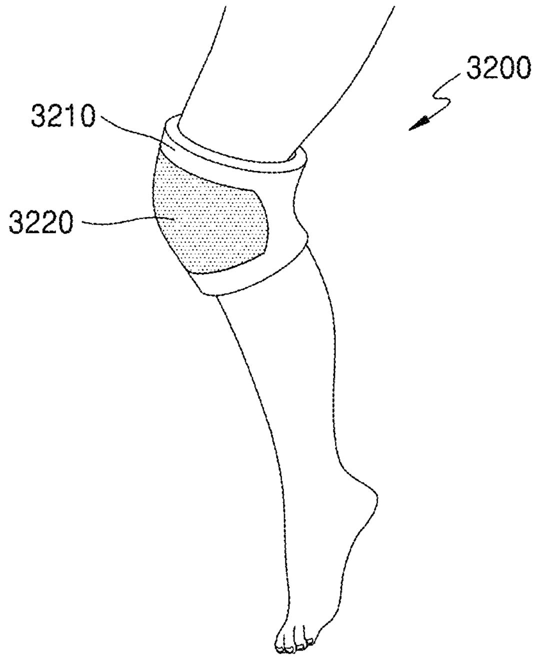

FIG. 21B shows a medical electronic device 3200. In one or more embodiments, the medical electronic device 3200 may include a body portion 3210 and an emission portion 3220. A display apparatus according to embodiments may be used as the emission portion 3220 of the medical electronic device 3200. The emission portion 3220 may emit light of a corresponding wavelength band (e.g., infrared light, visible light, etc.) to a patient's body. In one or more embodiments, the body portion 3210 may include a stretchable fiber material, and may have a structure that may be worn on the body of a user of the emission portion 3220.

The electronic devices shown in FIGS. 21A and 21B may each have a variable shape, but the disclosure is not limited thereto. As in embodiments to be described below, the display apparatus according to embodiments may be used in an electronic device in which a portion capable of expressing an image (e.g., a screen) is fixed.

Figure 21C:
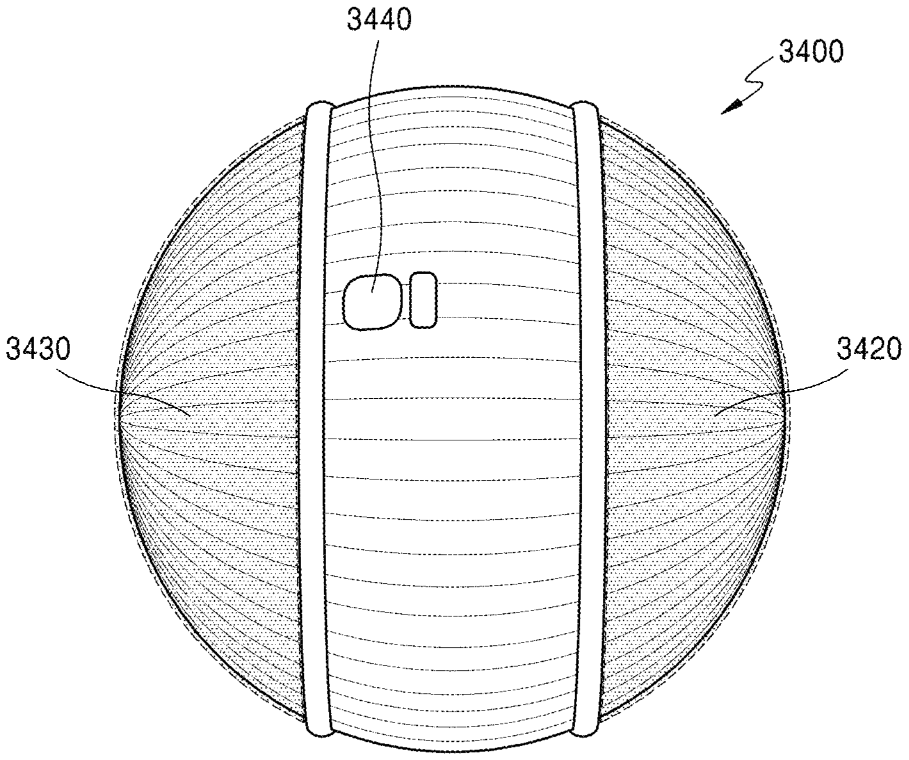

FIG. 21C shows a robot 3400 as an electronic device according to one or more embodiments. The robot 3400 may recognize movement or an object by using a camera 3440, and may display a corresponding image to a user through displays 3420 and 3430. In some embodiments, because display apparatuses according to one or more embodiments may be stretched in various directions, as described above, the display apparatuses may be assembled into a body frame having a hemispherical shape, and thus, the robot 3400 may include the displays 3420 and 3430 each having a hemispherical shape.

Figure 21D:
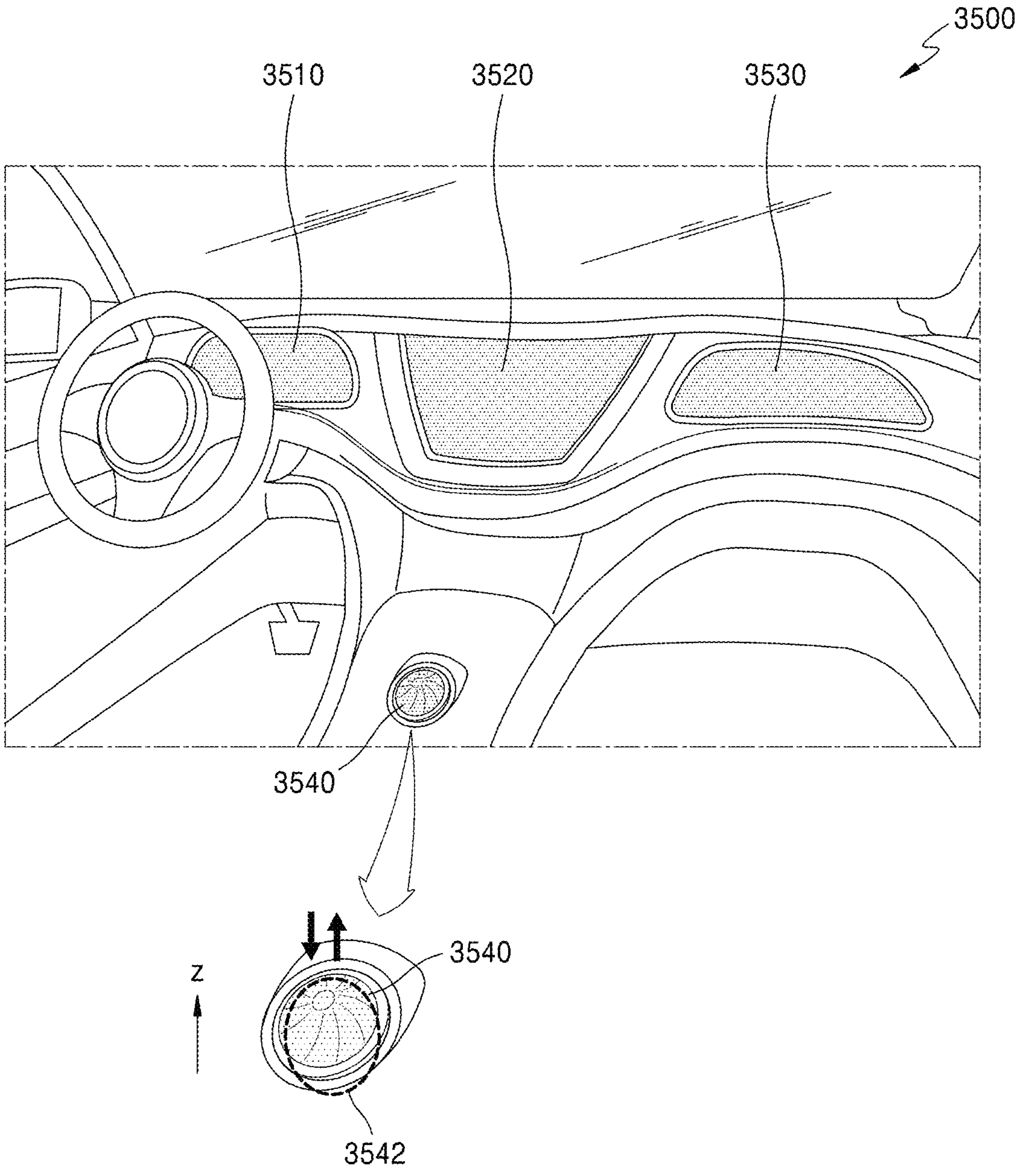

FIG. 21D shows a vehicle display device 3500 as an electronic device according to one or more embodiments. The vehicle display device 3500 may include a cluster 3510, a CID 3520, and/or a passenger display 3530. Because a display apparatus according to one or more embodiments may be stretched in various directions, the display apparatus may be used in the cluster 3510, the CID 3520, and/or the passenger display 3530 regardless of the shape of an internal frame of a vehicle.

FIG. 21D shows that the cluster 3510, the CID 3520, and/or the passenger display 3530 are separated from each other, but the disclosure is not limited thereto. In one or more other embodiments, two or more selected from the cluster 3510, the CID 3520, or the passenger display 3530 may be connected into a single body.

In some embodiments, the vehicle display device 3500 may include a button 3540 capable of expressing a corresponding image. Referring to the enlarged view of FIG. 21D, the button 3540 having a hemispherical shape may include an object 3542 for providing a feeling of use of the button 3540 while moving in the z direction or the −direction, and a display apparatus located on the object 3542. In some embodiments, if the object 3542 has a three-dimensionally round surface, the display apparatus may also have a three-dimensionally round surface.

Figure 21E:
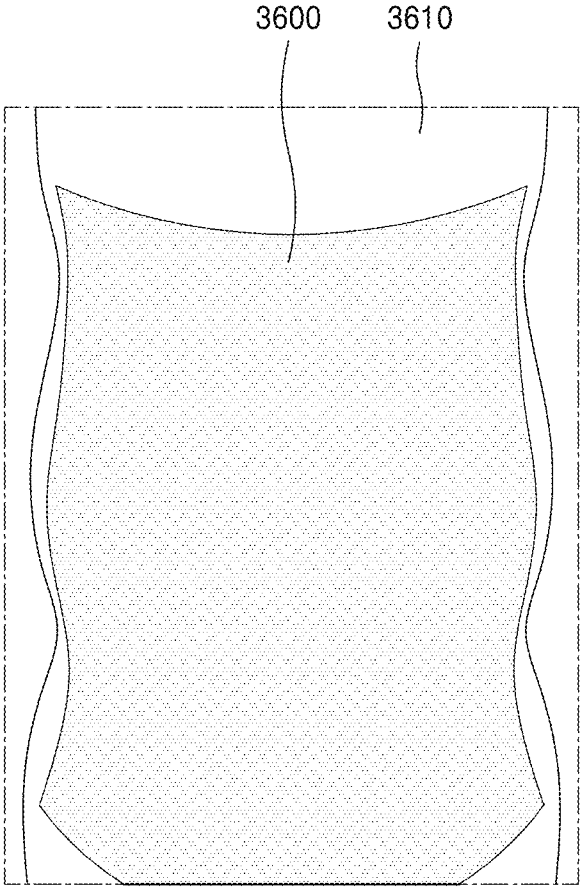

FIG. 21E shows an electronic device 3600 for advertising or exhibition as an electronic device according to one or more embodiments. In some embodiments, the electronic device 3600 for advertising or exhibition may be installed on a structure 3610 that is fixed, such as a wall or a pillar. If the structure 3610 includes an uneven surface as shown in FIG. 21E, the electronic device 3600 for advertising or exhibition may be arranged along the uneven surface of the structure 3610. In some embodiments, the electronic device 3600 for advertising or exhibition may be installed on the structure 3610 by using a heat-shrink film or the like.

One or more embodiments as described above provide a display apparatus and an operating method thereof, in which damage to a display panel may be reduced or prevented if stretching of the display panel is abnormal. However, the scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A display apparatus comprising:

a display panel comprising pixels and a strain sensor;

a signal detector configured to detect a first characteristic value, and to generate stretch-sensing data comprising a stretch time indicating a time interval between measurement time points, the first characteristic value indicating a degree of stretching of the strain sensor;

a memory configured to store a stress-strain profile divided into operation sections; and a signal processor configured to compare a rate of change of the first characteristic value indicating a temporal rate of change of the degree of stretching of the strain sensor with a threshold value of a current operation section by using the stretch-sensing data and the stress-strain profile, to determine a corresponding operation section among the operation sections, and to generate a control signal according to the corresponding operation section.

2. The display apparatus of claim 1, wherein the display panel further comprises sub-areas, wherein the signal detector is further configured to detect first characteristic values for the sub-areas, and to generate the stretch-sensing data, and wherein the signal processor is further configured to generate sub-control signals for the sub-areas.

3. The display apparatus of claim 1, wherein the display panel further comprises a touch sensor above the pixels, and integral with the strain sensor.

4. The display apparatus of claim 3, wherein the touch sensor comprises touch electrodes, and wherein the first characteristic value indicates an amount of change in capacitance of the touch electrodes.

5. The display apparatus of claim 1, wherein the control signal comprises a first emission control signal configured to turn off a voltage supplied to the pixels.

6. The display apparatus of claim 1, wherein the control signal comprises a second emission control signal configured to turn off transistors included in the pixels.

7. The display apparatus of claim 1, wherein the control signal comprises a display control signal for displaying protection operation activation information on the display panel.

8. The display apparatus of claim 1, further comprising a driving circuit configured to control the display panel, and configured to, based on the control signal, display protection operation information on the display panel, reduce light emission of the display panel, or block a driving voltage supplied to the display panel.

9. The display apparatus of claim 1, further comprising a communication module configured to transmit a signal to a stretching mechanism configured to stretch the display panel, and wherein the control signal comprises a mechanism control signal transmitted through the communication module for controlling an operation of the stretching mechanism.

10. The display apparatus of claim 1, further comprising a stretching mechanism configured to stretch the display panel, and configured to, based on the control signal, stop a stretching operation of the display panel, or perform a shrinking operation.

11. A display apparatus comprising:

a display panel comprising pixels and a strain sensor;

a signal detector configured to detect a first characteristic value, and to generate stretch-sensing data comprising a stretch time, the first characteristic value indicating a degree of stretching of the strain sensor;

a memory configured to store a stress-strain profile divided into operation sections; and a signal processor configured to compare a rate of change of the first characteristic value indicating a rate of change of the degree of stretching of the strain sensor with a threshold value of a current operation section by using the stretch-sensing data and the stress-strain profile, to determine a corresponding operation section among the operation sections, and to generate a control signal according to the corresponding operation section, wherein the operation sections comprise a first operation section, a second operation section, and a third operation section, wherein a threshold value of the first operation section corresponds to a boundary point between the first operation section and the second operation section in the stress-strain profile, wherein a threshold value of the second operation section corresponds to a boundary point between the second operation section and the third operation section in the stress-strain profile, and wherein a threshold value of the third operation section corresponds to an end point of the third operation section in the stress-strain profile.

12. The display apparatus of claim 11, wherein the first operation section comprises sub-operation sections, and wherein threshold values of the sub-operation sections respectively correspond to boundary points between the sub-operation sections in the stress-strain profile.

13. The display apparatus of claim 12, wherein the sub-operation sections are divided based on a slope in the stress-strain profile.

14. A method of operating a display apparatus comprising a display panel, the method comprising:

detecting a first characteristic value indicating a degree of stretching of the display panel using a strain sensor;

generating stretch-sensing data comprising a stretch time indicating a time interval between measurement time points;

detecting a rate of change of the first characteristic value indicating a temporal rate of change of the degree of stretching of the display panel over the stretch time;

determining, using the stretch-sensing data and a stress-strain profile pre-stored in a memory, a corresponding operation section among operation sections in the stress-strain profile; and controlling the display panel according to the corresponding operation section.

15. The method of claim 14, wherein the operation sections comprise a first operation section, a second operation section, and a third operation section, wherein a threshold value of the first operation section corresponds to a boundary point between the first operation section and the second operation section in the stress-strain profile, wherein a threshold value of the second operation section corresponds to a boundary point between the second operation section and the third operation section in the stress-strain profile, and wherein a threshold value of the third operation section corresponds to an end point of the third operation section in the stress-strain profile.

16. The method of claim 15, wherein the first operation section comprises sub-operation sections, and wherein threshold values of the sub-operation sections correspond to boundary points between the sub-operation sections in the stress-strain profile.

17. The method of claim 16, wherein the controlling of the display panel comprises displaying protection operation information on the display panel that is different for each of the sub-operation sections.

18. The method of claim 14, wherein the display panel comprises sub-areas, wherein the strain sensor is configured to detect first characteristic values for the sub-areas, and wherein the determining of the corresponding operation section comprises determining operation sections for the sub-areas.

19. The method of claim 18, wherein the controlling of the display panel comprises controlling the sub-areas according to the operation sections.

20. The method of claim 14, wherein the controlling of the display panel according to the corresponding operation section comprises at least one of:

displaying protection operation information on the display panel;

reducing light emission of the display panel; or blocking a driving voltage supplied to the display panel.

21. The method of claim 14, further comprising, when the rate of change in the first characteristic value is greater than a threshold value of a current operation section, controlling a stretching mechanism according to the corresponding operation section, the stretching mechanism being configured to stretch the display panel.

* * * * *